United States Patent [19]

Mizoguchi

[11] Patent Number: 4,859,956
[45] Date of Patent: Aug. 22, 1989

[54] VALIDITY DECISION CIRCUIT CAPABLE OF CORRECTLY DECIDING VALIDITY OF AN ERROR SIGNAL IN A MULTILEVEL QUADRATURE AMPLITUDE DEMODULATOR

[75] Inventor: Shoichi Mizoguchi, Tokyo, Japan
[73] Assignee: NEC Corporation, Japan
[21] Appl. No.: 264,150
[22] Filed: Oct. 28, 1988

[30] Foreign Application Priority Data

Oct. 30, 1987 [JP] Japan .................................. 62-274938
Dec. 30, 1987 [JP] Japan .................................. 62-336101
Oct. 7, 1988 [JP] Japan .................................. 63-253343

[51] Int. Cl.$^4$ .............................................. H03D 3/18
[52] U.S. Cl. ..................................... 329/50; 329/109; 329/135
[58] Field of Search ................. 329/50, 107, 109, 110, 329/122, 124, 135; 375/39, 81, 97, 120

[56] References Cited

U.S. PATENT DOCUMENTS 4,757,266 7/1988 Yoshida et al. ................. 329/135 X Primary Examiner—David Mis
Attorney, Agent, or Firm—Laff, Whitesel, Conte & Saret

[57] ABSTRACT

In a demodulator for demodulating a multilevel quadrature amplitude modulated signal specified by a plurality of output signal points arranged on an approximately octangular specific region into an in-phase baseband signal and a quadrature baseband signal and for converting the in-phase and the quadrature baseband signals into a demodulator output signal and an error signal, a validity decision circuit (40) is supplied with the in-phase and the quadrature baseband signals to decide that the error signal is valid when at least one reception signal point is outwardly of the approximately octangular specific region.

5 Claims, 15 Drawing Sheets

| BIT PATTERN NUMBER | | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| ADDRESS INFORMATION | DP1 | X | X | X | X | X | X | X | X | X | X | X | X | X | X | X | X |
| | DP2 | X | X | 1 | 1 | 1 | 1 | 1 | 1 | 1 | 1 | 1 | 1 | 1 | 1 | 1 | 1 |
| | DP3 | X | X | 1 | 1 | 1 | 1 | 1 | 1 | 1 | 1 | 1 | 0 | 0 | 1 | 0 | 0 |
| | DP4 | X | X | 1 | 1 | 1 | 1 | 0 | 1 | 0 | X | X | 1 | 1 | X | 1 | 0 |
| | DP5 | X | X | X | X | X | X | X | X | X | X | X | X | X | X | X | X |
| | EP1 | X | X | 1 | 1 | 1 | X | 1 | X | 1 | X | X | 1 | 1 | X | X | 1 |
| | EP2 | X | 1 | X | X | X | X | X | X | X | X | X | X | X | X | X | X |
| | DQ1 | X | X | X | X | X | X | X | X | X | X | X | X | X | X | X | X |
| | DQ2 | X | X | 1 | 1 | 1 | 1 | 1 | 1 | 1 | 1 | 1 | 1 | 1 | 1 | 1 | 1 |
| | DQ3 | X | X | 1 | 0 | 0 | 1 | 1 | 0 | 0 | 1 | 1 | 1 | 1 | 1 | 1 | 1 |
| | DQ4 | X | X | X | 1 | 0 | X | X | 1 | 1 | 1 | 0 | 1 | 0 | 1 | 1 | 1 |
| | DQ5 | X | X | X | X | X | X | X | X | X | X | X | X | X | X | X | X |
| | EQ1 | X | X | X | X | 1 | X | X | 1 | 1 | X | 1 | X | 1 | 1 | 1 | 1 |
| | EQ2 | 1 | X | X | X | X | X | X | X | X | X | X | X | X | X | X | X |

FIG. 16

VALIDITY DECISION CIRCUIT CAPABLE OF CORRECTLY DECIDING VALIDITY OF AN ERROR SIGNAL IN A MULTILEVEL QUADRATURE AMPLITUDE DEMODULATOR

BACKGROUND OF THE INVENTION:

This invention relates to a validity decision circuit for use in a multilevel quadrature amplitude demodulator used as a counterpart of a multilevel quadrature amplitude modulator. Such a validity decision circuit is particularly useful in a digital radio transmission system.

In the digital radio transmission system, the multilevel quadrature amplitude modulator is used in effectively utilizing a radio frequency band as known in the art. In the multilevel quadrature amplitude modulator, a pair of quadrature-phase carrier signals are amplitude modulated by an input signal into a quadrature amplitude modulated signal. When the input signal is an n-bit binary signal where n is a predetermined number, the input signal can have $2^n$ signal values. The quadrature amplitude modulated signal has $2^n$ output signal points specified on a phase plane which has an origin and real and imaginary axes orthogonally crossing at the origin. The output signal points are arranged on a square region which has a center point at the origin and four sides parallel to the real and the imaginary axes. Such an arrangement is called a square signal point arrangement. The output signal points are in one-to-one correspondence to the $2^n$ signal values. Such a multilevel quadrature amplitude modulator is called a $2^n$-ary quadrature amplitude modulator. This means that the number of the output signal points are as many as $2^n$, such as sixty-four, two-hundred and fifty-six. The quadrature amplitude modulated signal is transmitted from a transmitter with a certain transmission power to the multilevel quadrature amplitude demodulator through a transmission path.

The transmission power is dependent on a peak amplitude of the quadrature amplitude modulated signal, namely, a distance between the origin and the output signal points placed at each vertex of the square region. The peak amplitude increases in proportion to an increase in the number of the output signal points. It is desirable to reduce the transmission power.

In order to reduce the peak amplitude, the square signal point arrangement is modified into an approximately circular or octangular arrangement according to signal conversion disclosed in U.S. Pat. No. 4,675,619 issued to Junichi Uchibori et al and assigned to the instant assignee. A multilevel quadrature amplitude modulator of Uchibori et al patent comprises a signal conversion circuit for converting the square signal point arrangement into the approximately circular arrangement defined by a specific region inwardly of an approximate circle. As a result of signal conversion, a plurality of output signal points are shifted from areas of four corners of the square region to other areas outwardly near to the four sides of the square region so that shifted output signal points are inwardly of the specific region.

The multilevel quadrature amplitude demodulator receives the quadrature amplitude modulated signal as a demodulator input signal which is subjected to distortion by fading or the like. The demodulator input signal has $2^n$ reception signal points. The reception signal points may deviate from the $2^n$ output signal points. The multilevel quadrature amplitude demodulator is combined with an equalizer for equalizing the fading distortion. The multilevel quadrature amplitude demodulator comprises a PLL (phase lock loop) circuit and a signal inverse conversion circuit for carrying out inverse conversion relative to the signal conversion in the multilevel quadrature amplitude modulator. In order to generate a tap control signal, it is necessary for the equalizer to provide an error signal which represents deviation of the output signal points in the demodulator input signal. In the multilevel quadrature amplitude demodulator of Uchibori et al patent, the error signal is obtained after the inverse conversion. The inverse conversion is, however, not correct until synchronization of the PLL circuit is established. The error signal is therefore uncertain while the synchronization of the PLL circuit is unstable. This means that the equalizer suspends its operation until the synchronization of the PLL circuit is established.

SUMMARY OF THE INVENTION:

It is therefore an object of this invention to provide a validity decision circuit which is capable of correctly deciding validity of an error signal produced from a multilevel quadrature amplitude demodulator.

A validity decision circuit to which this invention is applicable is for use in a demodulator used as a counterpart of a modulator for modulating a modulator input signal into a multilevel quadrature amplitude modulated signal specified by a plurality of signal points on a phase plane having an origin and real and imaginary axes crossing at the origin. The modulator rearranges a square arrangement of the signal points into an approximately octangular arrangement in which the signal points are arranged on an approximately octangular region having a specific region inwardly of an octangle. The demodulator is for demodulating the multilevel quadrature amplitude modulated signal into an in-phase baseband signal and a quadrature baseband signal and for converting the in-phase and the quadrature baseband signals into a demodulator output signal and an error signal. The in-phase baseband signal has an in-phase signal level. The quadrature baseband signal has a quadrature signal level. Each of the in-phase and the quadrature signal levels is related to one of the signal points at a time.

According to an aspect of this invention, the validity decision circuit comprises adder means for adding the in-phase baseband signal and the quadrature baseband signal to produce a sum signal having a sum level representing a sum of the in-phase signal level and the quadrature signal level. The sum level is orthogonal to a sum axis which passes through the origin and forms an angle of forty-five degrees with both of the real and the imaginary axes. The validity decision circuit further comprises subtracter means for subtracting the in-phase signal level and the quadrature signal level to subtraction to produce a difference signal having a difference level for representing a difference of the in-phase signal level and the quadrature signal level. The difference level is orthogonal to a difference axis which passes through the origin and orthogonally crosses the sum axis. The validity decision circuit sill further comprises first discriminating means responsive to the in-phase baseband signal for discriminating the in-phase signal level to produce a first binary discrimination signal, second discriminating means responsive to the quadrature baseband signal for discriminating the quadrature signal level to produce a second binary discrimination signal, third discriminating means coupled to the adder means and responsive to the sum signal for discriminating the sum level to produce a third binary discrimination signal, fourth discrimination means coupled to the subtracter means for discriminating the difference level to produce a fourth binary discrimination signal, and OR gate means responsive to the first through the fourth binary discrimination signals for producing at least one of the first through the fourth discrimination signals as a decision signal representing the fact that the error signal is valid.

According to another aspect of this invention, the validity decision circuit comprises a first analog-to-digital converter for converting the in-phase baseband signal into a first converted digital signal representing the in-phase signal level, a second analog-to-digital converter for converting the quadrature baseband signal into a second converted digital signal representing the quadrature signal level, and a decision circuit coupled to the first and the second analog-to-digital converters and responsive to the first and the second converted digital signals for deciding whether or not at least one of the signal points is outwardly of the specific region, the decision circuit thereby producing a decision signal representing the fact that the error signal is valid.

BRIEF DESCRIPTION OF THE DRAWING:

FIG. 16 is a view for use in describing operation of a decision circuit in the validity decision circuit illustrated in FIG. 13;

Figure 1:
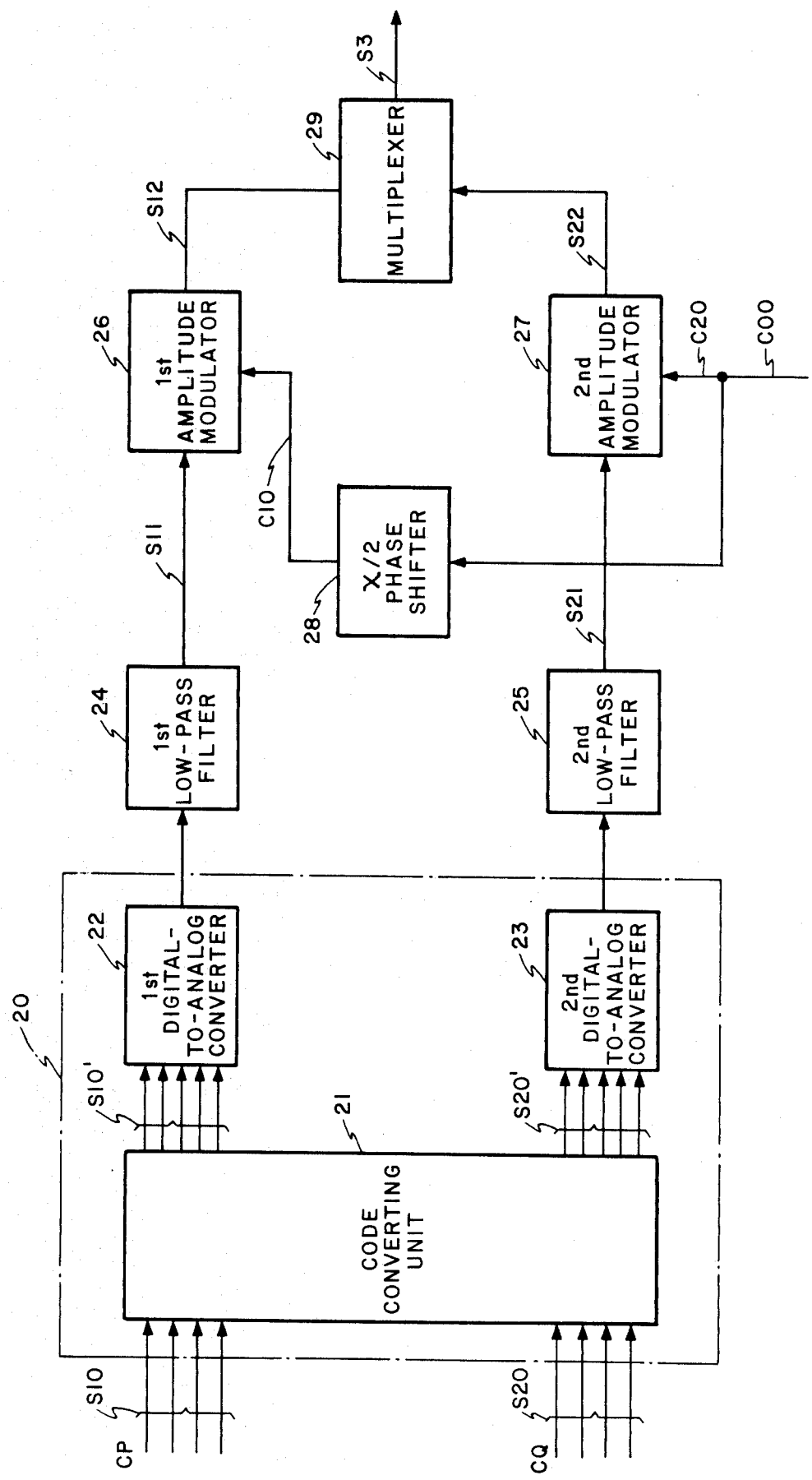
FIG. 1 is a block diagram of a conventional multilevel quadrature amplitude modulator.
Figure 2:
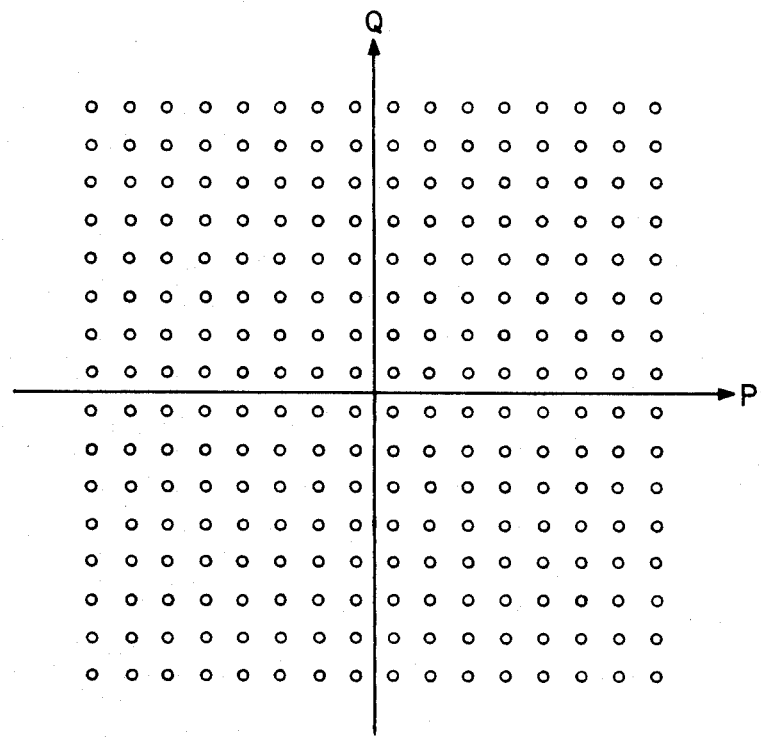
FIG. 2 is a view for use in describing a signal point arrangement of a conventional multilevel quadrature amplitude modulator.

DESCRIPTION OF THE PREFERRED EMBODIMENTS:

Referring to FIGS. 1 and 2, a conventional multilevel quadrature amplitude modulator will be described at first in order to facilitate an understnading of the present invention. The conventional multilevel quadrature amplitude modulator is of the type disclosed in the Uchibori et al patent referred to hereinabove and is for use in a 256-ary quadrature amplitude modulator.

In FIG. 1, the modulator comprises a converting circuit 20 supplied with a first input digital signal S10 of a channel CP and a second input digital signal S20 of another channel CQ. Each of the first and the second input digital signals S10 and S20 is a four-bit binary digital signal and is capable of representing sixteen levels. The converting circuit 20 is for converting the first and the second input digital signals S10 and S20 to first and second analog signals in the manner which will be described below.

The converting circuit 20 comprises a code converting unit 21 and first and second digital-to-analog converters 22 and 23. The code convertng unit 21 is supplied with two hundred and fifty-six signal values. The code converting unit 21 is for rearranging two hundred and fifty-six output signal points (shown by white circles) of a square signal point arrangement illustrated in FIG. 2 into an approximately circular or octangular arrangement on a phase plane by carrying out code conversion as will later be described. More specifically, the first and the second input digital signals S10 and S20 are converted by the code converting unit 21 to first and second modified digital signals S10' and S20'. Each of the first and the second modified digital signals S10' and S20' has five bits and can represent thirty-two levels at maximum. In the example being illustrated, only eighteen levels are specified by each modified digital signal in the manner described in the Uchibori et al patent. Each of the first and the second digital-to-analog converters 22 and 23 converts the first and the second modified digital signals S10' and S20' to the first and the second analog signals, each of which has an amplitude determined by eighteen levels of the first and the second modified digital signals S10' and S20'.

The first and the second analog signals are delivered through first and second low-pass filters 24 and 25 to first and second amplitude modulators 26 and 27 as first and second modulating signals S11 and S21, respectively. The first and the second amplitude modulators 26 and 27 are also supplied with a first carrier signal C10 and a second carrier signal C20 having a quadrature phase difference relative to the first carrier signal C10. The first and the second amplitude modulators 26 and 27 amplitude modulate the first and the second carrier signals C10 and C20 by the first and the second modulating signals S11 and S21, respectively.

In order to produce the first and the second carrier signals C10 and C20, the demodulator comprises an oscillator (not shown) for producing a carrier oscillation signal C00. The carrier oscillation signal C00 is given through a $\pi/2$-phase shifter 28 to the first amplitude modulator 26 as the first carrier signal C10. The carrier oscillation signal C00 is also given to the second modulator 27 as the second carrier signal C20.

The first and the second amplitude modulators 26 and 27 produce first and second modulated signals S12 and S22 and deliver the first and the second modulated signals S12 and S22 to a multiplexer 29. The multiplexer 28 is for multiplexing the first and the second modulated signals S12 and S22 into a multilevel quadrature amplitude modulated signal S3. The signal S3 has two hundred and fifty-six output signal points rearranged to the approximately circular arrangement as will later be described. The signal S3 is amplified by a transmission power amplifier (not shown) and transmitted to the multilevel quadrature amplitude demodulator through a transmission path.

In FIG. 2, the two hundred and fifty-six output signal points are arranged on the phase plane defined by an origin O and orthogonal coordinate axes which are usually referred to as real and imaginary axes P and Q crossing at the origin O. The real and the imaginary axes P and Q represent the first and the second modulated signals S12 and S22 for the respective channels CP and CQ described in conjunction with FIG. 1.

Figure 3:
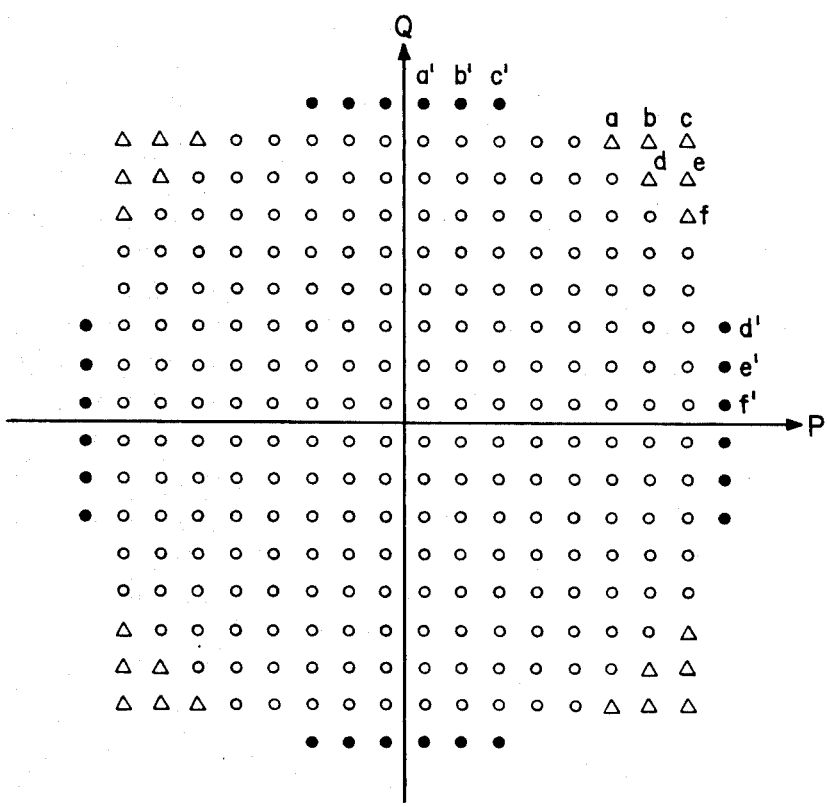
FIG. 3 is a view of a signal point arrangement for use in describing signal conversion in the multilevel quadrature amplitude modulator illustrated in FIG. 1.

Referring to FIG. 3, description will be made as regards the the code conversion in the code converting unit 21. Although the description is restricted to a first quadrant of the phase plane, the description applies to the remaining quadrants.

In FIG. 3, sixty-four output signal points of the first and the second input digital signals S10 and S20 are mapped on the first quadrant in the form of a square of eight-by-eight, like in FIG. 2. In other words, outermost output signal points, fifteen in number, of the output signal points are arranged along two sides of the square before the first and the second input digital signals S10 and S20 are subjected to the code conversion. The outermost output signal points has a vertex output signal point placed at a corner of the square opposite to the origin O. A distance between the origin O and the vertex output signal point is equal to a length of a diagonal of the square.

Figure 4:
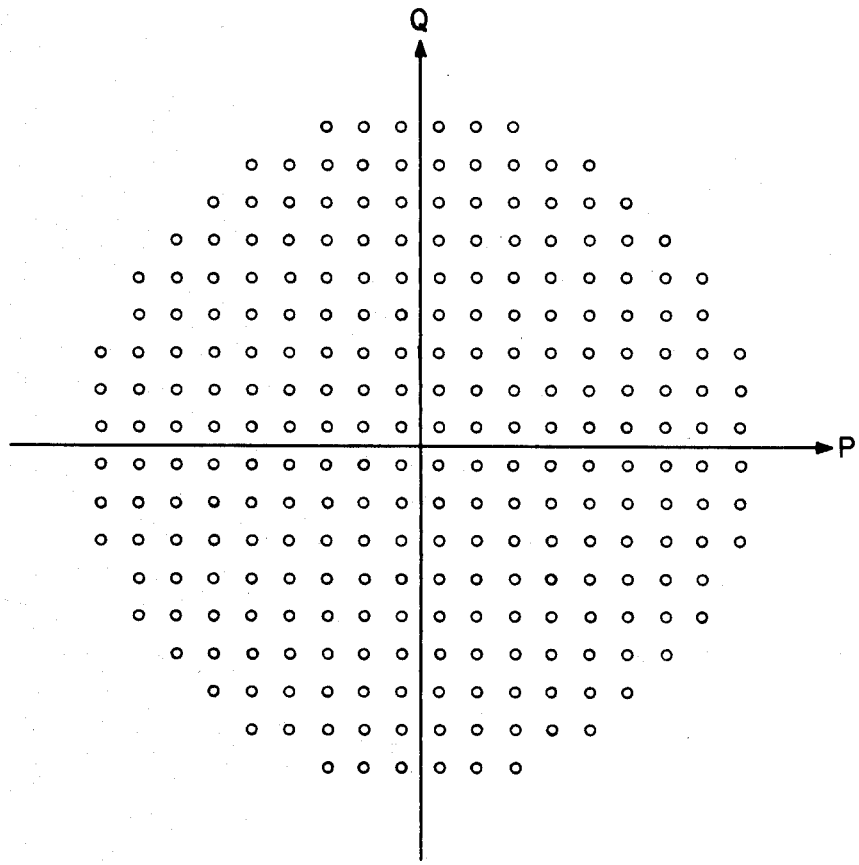
FIG. 4 is a view for use in describing a signal point arrangement of the multilevel quadrature amplitude modulator illustrated in FIG. 1.

Briefly, the code conversion is for shifting the vertex output signal point and the adjacent one or ones of the output signal points (shown by triangles which are depicted at a, b, c, d, e, and f) from a corner area of the square to two outside areas of the square, as shown by black circles which are depicted at a', b', c', d', e', and f'. The resultant output signal points are rearranged in the approximately circular arrangement on the phase plane. To be accurate, the resultant output signal points are rearranged in an approximately octangular arrangement having a specific region inwardly of an octangle as shown in FIG. 4.

Figure 5:
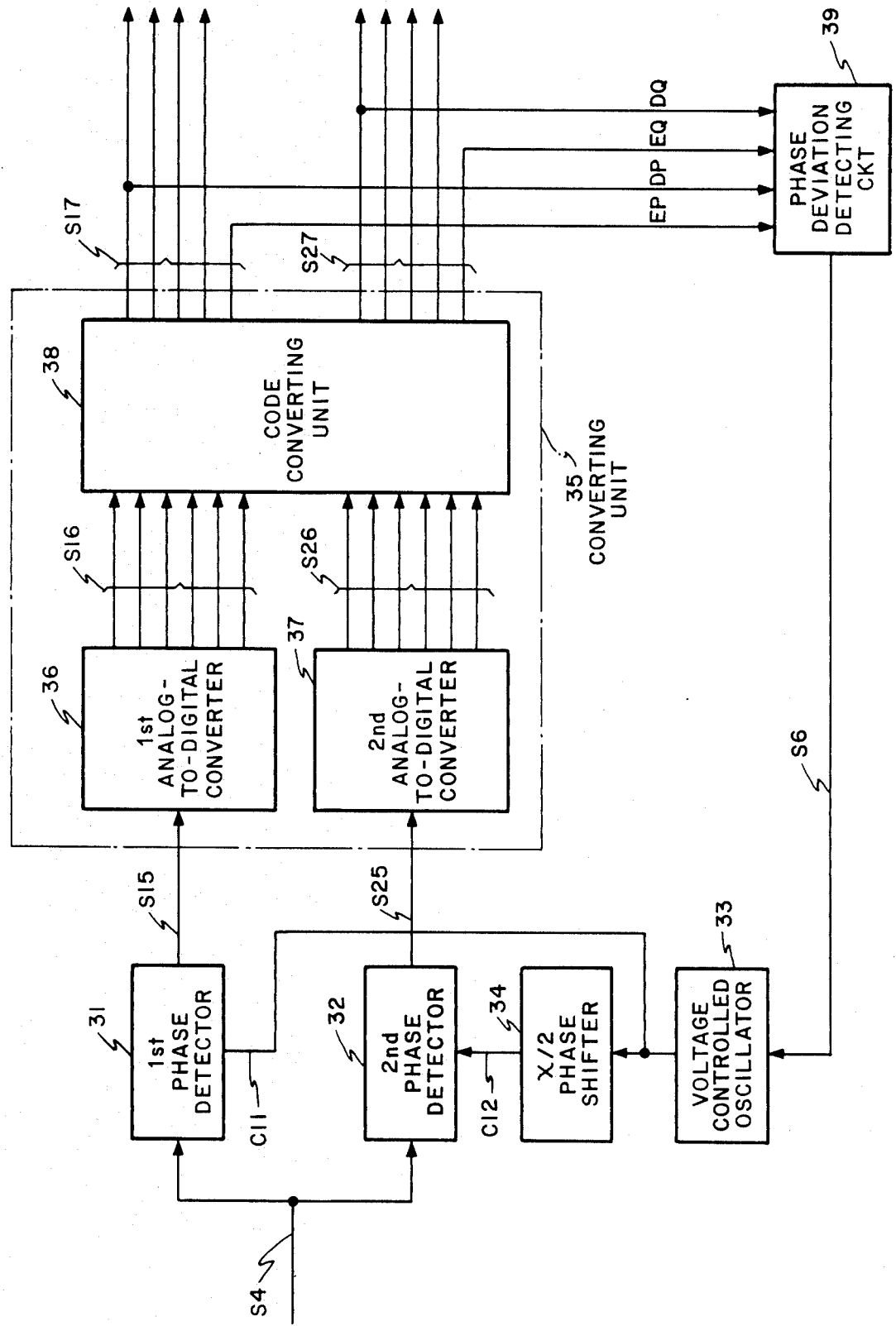
FIG. 5 is a block diagram of a conventional multilevel quadrature amplitude demodulator for use as a counterpart of the multilevel quadrature amplitude modulator illustrated in FIG. 1.

Referring to FIG. 5, a conventional multilevel quadrature amplitude demodulator is for use as a counterpart of the modulator described above and is also disclosed in the Uchibori et al patent referred to hereinabove.

The demodulator comprises first and second phase detectors 31 and 32 supplied with the multilevel quadrature amplitude modulated signal as a demodulator input signal S4. The demodulator input signal S4 has two hundred and fifty-six reception signal points which are in one-to-one correspondence to the output signal points shown in FIG. 4. The first and the second phase detectors 31 and 32 carry out phase detection of the demodulator input signal S4 with reference to first and second local carrier signals C11 and C12 which may be called reproduced carrier signals. The second local carrier signal C11 has a quadrature phase difference relative to the first local carrier signal C11. As a result of the phase detection, the first phase detector 31 produces an in-phase baseband signal S15 for the channel CP. Similarly, the second phase detector 32 produces a quadrature baseband signal S25 for the channel CQ. The in-phase baseband signal S15 has an in-phase signal level which can have one of eighteen levels. Likewise, the quadrature baseband signal S25 has a quadrature signal level which can have one of eighteen levels.

The demodulator further comprises a voltage controlled oscillator 33 responsive to a phase control signal S6 (to be later detailed) for producing a local oscillation signal. The local oscillation signal is given to the first phase detector 31 as the first local carrier signal C11. The local oscillation signal is also given through a $\pi/2$-phase shifter 34 to the second phase detector 32 as the second local carrier signal C12.

The demodulator still further comprises a converting circuit 35 supplied with the in-phase and the quadrature baseband signals S15 and S25. The converting unit 35 comprises first and second analog-to-digital converters 36 and 37 and a code converting unit 38. The in-phase and the quadrature baseband signals S15 and S25 are supplied to first and second analog-to-digital converters 36 and 37, respectively.

The first and the second analog-to-digital converters 36 and 37 convert the in-phase and the quadrature baseband signals S15 and S25 into first and second digital signals S16 and S26, respectively. Each of the first and the second digital signals S16 and S26 has six bits numbered from a zeroth bit (most significant bit) to a fifth bit (least significant bit). As known in the art, the least significant bits of the first and the second digital signals S16 and S26 represent phase deviation. Five remaining bits of the first digital signal S16 collectively represent a reproduction of the first modified digital signal S10' (FIG. 1). Likewise, five remaining bits of the second digital signal S26 represent a reproduction of the second modified digital signal S20' (FIG. 1).

The code converting unit 38 is for carrying out inverse code conversion relative to the code conversion which is used in the code converting unit 21 described in conjunction with FIG. 1. By the inverse code conversion, the approximately octangular arrangement is converted into the square signal point arrangement in the manner described in Uchibori et al patent.

The code converting unit 38 converts the first and the second digital signals S16 and S26 to first and second output digital signals S17 and S27. Each of the first and the second output digital signals S17 and S27 has five bits numbered from a first bit to a fifth bit. The first through the fourth bits of the first output digital signal S17 collectively represent a reproduction of the first input digital signal S10 (FIG. 1). Likewise, the firt through the fourth bits of the second output digital signal S27 represent a reproduction of the second input digital signal S20 (FIG. 1). The first bits of the first and the second output digital signals S17 and S27 are produced as first and second data signals DP and DQ representative of one of first through fourth quadrants in the phase plane. The fifth bits of the first and the second output digital signals S17 and S27 are produced as first and second phase deviation signals EP and EQ representative of the phase deviations of the first and the second digital signals S16 and S26, respectively. Each of the first and the second phase deviation signals EP and EQ may be called an error signal and is used also in controlling an equalizer as will later be described.

A phase deviation detecting circuit 39 is supplied with the first and the second data signals DP and DQ and the first and the second phase deviation signals EP and EQ and produces the phase control signal S6. The phase control signal S6 is delivered to the voltage controlled oscillator 33. The local oscillation signal of the voltage controlled oscillator 33 is controlled and phase-locked in response to the phase control signal S6. Thus, the illustrated demodulator comprises a phase lock loop circuit which comprises the first and the second phase detectors 31 and 32, the converting unit 35, the phase deviation detecting circuit 39, the voltage controlled oscillator 33, and the $\pi/2$ phase shifter 34.

As shown in the art, the reception signal points of the demodulator input signal S4 inevitably have positioned deviation, namely, the phase deviation, deviated from the respective positions of the output signal points shown in FIG. 4. Each of the first and the second phase deviation signals EP and EQ represents the positional deviation in the form of logic one and zero values as will be described below.

Figures 6, 7:
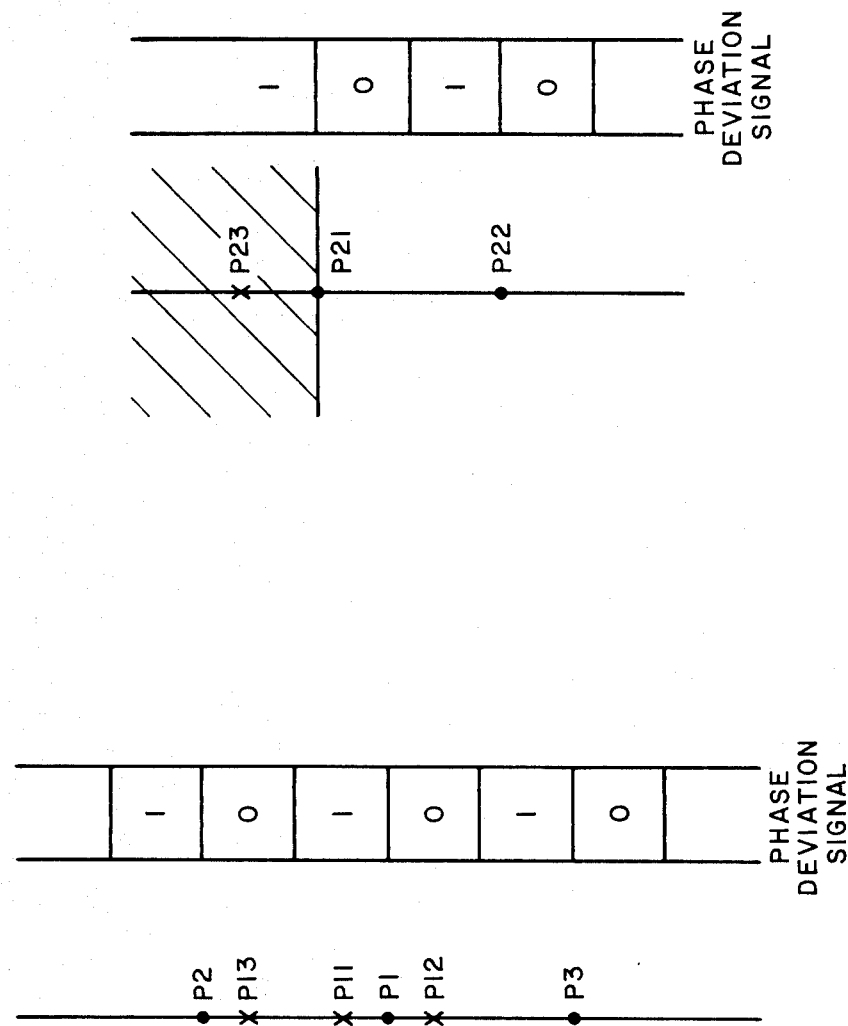
FIG. 6 is a view for use in describing phase deviation in a demodulator input signal of the multilevel quadrature amplitude demodulator illustrated in FIG. 5.
FIG. 7 is a view for use in describing validity decision of a conventional validity decision circuit.

Referring to FIG. 6, description will be made as regards a specific reception signal point. In FIG. 6, first through third points are depicted at P1, P2, and P3 as reference position of the specific reception signal point and two adjacent ones of the reception signal points. It is desirable that the specific reception signal point is on the first point P1. For example, the phase deviation signal has the logic one value when the specific reception signal point deviates from the first point P1 to another point depicted at P11. On the other hand, the phase deviation signal has the logic zero level when the specific reception signal point deviates from the first point P1 to another point depicted at P12. However, when the specific reception signal point deviates from the first point P1 to another point depicted at P13 over an intermediate point between the first and the second points P1 and P2, the phase deviation signal has the logic zero value and is invalid. A disadvantage described above tends to occur before synchronization of the phase lock loop is established. It is therefore necessary to decide whether or not the phase deviation signal is valid.

A MLE (maximum level error) method is known in the art as a method for deciding validity of the phase deviation signal. In order to carry out validity decision according to the MLE method, the demodulator must include a validity decision circuit. The validity decision circuit decides whether or not at least one reception signal points is outwardly of a square region on the phase plane. The square region is defined by a square which is formed by outermost output signal points in the square signal point arrangement shown in FIG. 2. This is based on the reason described below.

Referring to FIG. 7, a first point P21 is a reference position of an outermost reception signal point while a second point P22 is another reference position of an inside reception signal point which is adjacent to the outermost reception signal point. In this event, it is rarely the case that the inside reception signal point deviates from the second point P22 to an outer point P23 over the first point P21. It is therefore certainly that the reception signal point positioned at the outer point P23 is the outermost reception signal point. This means that the phase deviation signal is certainly valid when at least one of the reception signal points deviates outwardly of the square region. Thus, the squre region is regarded as an invalid region while outside of the square region is regarded as a valid region as depicted by hatched lines in FIG. 7.

In the conventional demodulator, the validity decision should be carried out after the approximately octangular arrangement is converted into the square signal point arrangement.

Figure 8:
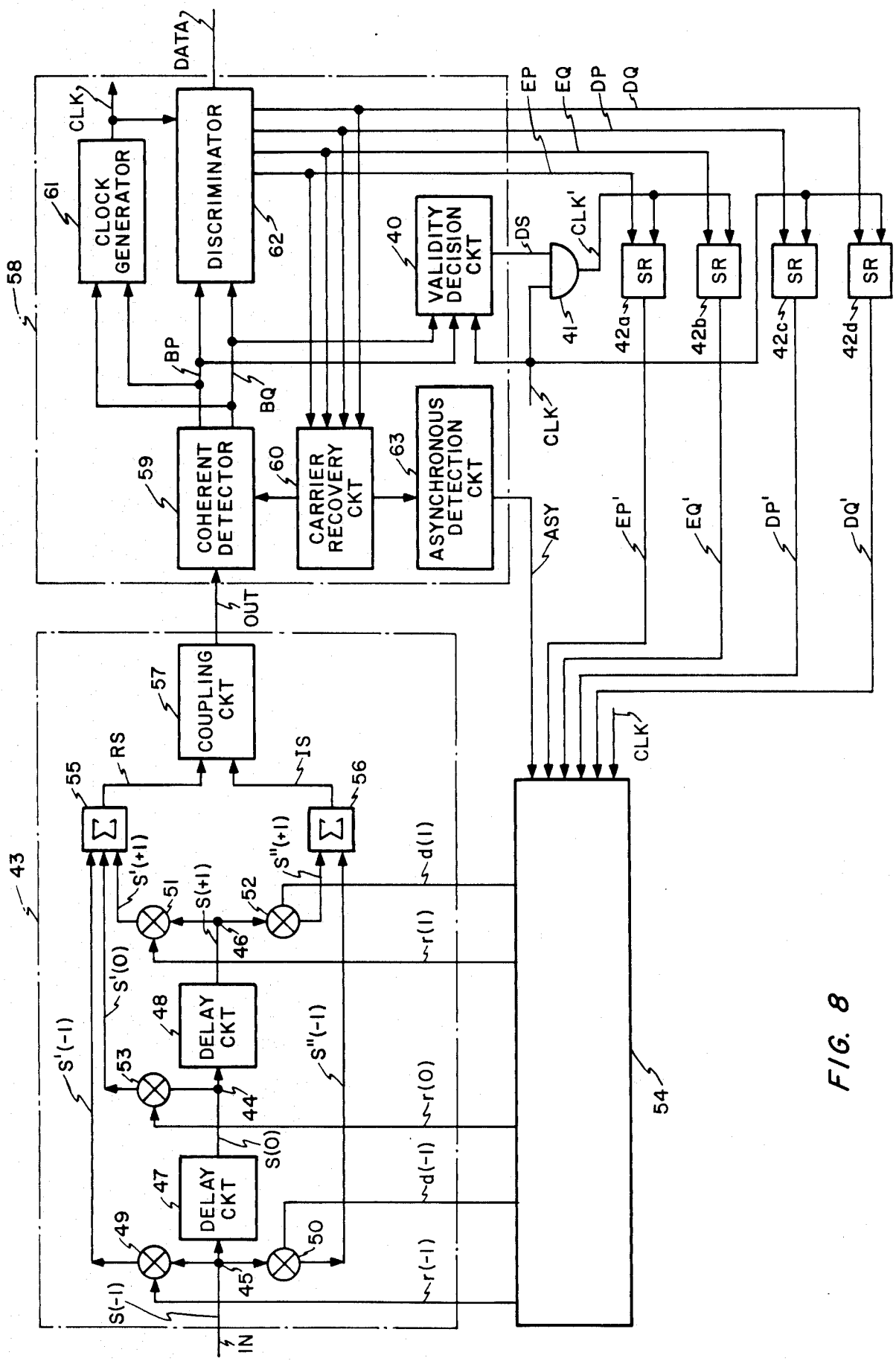
FIG. 8 is a block diagram of an adaptive equalizer system for applying a validity decision circuit according to this invention.

Referring to FIG. 8, the description will be directed to an adaptive equalizer system for a better understanding of this invention. Except for a validity decision circuit 40 according to the invention, an AND gate 41, and first through fourth flip flops 42a, 42b, 42c, and 42d, the adaptive equalizer system is disclosed in U.S. Pat. No. 4,453,256 issued to Toshihiko Ryu and assigned to the instant assignee. The adaptive equalizer system is supplied with a received signal IN of an intermediate frequency band. The received signal IN is subjected to sixteen-level quadrature amplitude modulation at a predetermined modulation rate. The received signal IN is modulated by or carries a transmission data signal digitized by a reference clock signal. The reference clock signal has a reference clock frequency which is equal to the predetermined modulation rate.

The adaptive equalizer system comprises a transversal filter 43 for filtering the received signal IN into an equalized signal OUT in response to a plurality of controllable tap gains C(j) where j represents tap numbers, such as $(-1)$, 0, and $(+1)$. The equalized signal OUT is also subjected to multilevel quadrature amplitude modulation like the received signal IN but is equalized by the transversal filter 43. The illustrated transversal filter 43 has three taps. A central one of the three taps may be called a central or a first tap 44. The remaining ones of the taps are depicted on the lefthand and the righthand sides of the central tap 44 and may be called second and third taps 45 and 46, respectively. The second and the third taps 45 and 46 may be referred to as first and second additional taps.

First and second delay units 47 and 48 are placed between the second and the first taps 45 and 44 and between the first and the third taps 44 and 46, respectively. Each of the first and the second delay units 47 and 48 provides a delay which is substantially equal to a reciprocal of the predetermined modulation rate. The received signal IN is delivered to the second tap 45 as a first one of additional tap signals and successively delayed by the first and the second delay units 47 and 48 to be produced as a central tap signal and a second additional tap signal which are sent to the first and the third taps 44 and 46, respectively.

Let the second, the first, and the third taps 45, 44, and 46 be specified by consecutive numbers of $(-1)$, 0, and $(+1)$, respectively, taking the successive delays into consideration. In this connection, the first additional tap signal appearing as the $(-1)$ tap 45 may be specified by S(−1). Likewise, the central and the second additional tap signals may be specified by S(0) and S(+1), respectively.

Inasmuch as the received signal IN is subjected to the multilevel quadrature amplitude modulation as mentioned before, the received signal IN includes an in-phase and a quadrature phase component. The in-phase and the quadrature phase components are individually processed with reference to the central tap signal S(0). More specifically, the first additional tap signal S(−1) is delivered to a first in-phase multiplier 49 and a first quadrature multiplier 50. The second additional tap signal S(+1) is delivered to a second in-phase multiplier 51 and a second quadrature multiplier 52 in the manner described in the Ryu patent. The central tap signal S(0) is given to a central in-phase multiplier 53 alone because no quadrature phase component is present in the central tap signal S(0). Each of the multipliers 49 to 53 may be referred to as a weighting circuit.

The controllable tap gains C(0), C(−1), and C(+1) are produced by a gain control circuit 54 in the manner described in the Ryu patent. The controllable tap gains C(0), C(−1), and C(+1) may be referred to as a central complex control signal, first and second complex control signals, respectively. The central complex control signal C(0) consists of a real part alone and is therefore represented by r(0) in FIG. 1. On the other hand, each of the first and thes econd complex control signals C(−1) and C(+1) consists of a real part and an imaginary part represented by r and d, respectively. In FIG. 1, the first complex control signal C(−1) is specified by a combination of r(−1) and d(−1) while the second complex control signal C(+1), a combination of r(1) and d(1).

As shown in FIG. 8, the real and the imaginary parts r(−1) and d(−1) of the first complex control signal C(−1) are delivered from the gain control circuit 54 to the first in-phase and the first quadrature multipliers 49 and 50, respectively. Likewise, the real and the imaginary parts r(1) and d(1) of the second complex control signal C(+1) are delivered to the second in-phase and the second quadrature multipliers 51 and 52, respectively. The central complex control signal C(0) or r(0) is sent to the central in-phase multiplier 53 in a usual manner.

the first in-phase and the first quadrature multipliers 49 and 50 supply first and second adders 55 and 56 with a first controlled in-phase component S'(−1) and a first controlled quadrature component S''(−1), respectively. The second in-phase and the second quadrature multipliers 51 and 52 supply the first and the second adders 55 and 56 with a second controlled in-phase componednt and a second controlled quadrature component which are represented by S'(+1) and S''(+1), respectively. Each of the first and the second in-phase components may be named a first controlled signal while each of the first and the second quadrature components is named a second controlled signal. A central controlled in-phase component S'(0) is sent from the central in-phase multiplier 53 to the first adder 55.

The first and the second adders 55 and 56 carry out addition to produce an in-phase signal RS and a quadrature signal IS representative of results of the addition, respectively. The in-phase and the quadrature signals RS and IS are combined together by a coupling circuit 57 into a coupled signal with a quadrature phase relation kept between the in-phase and the quadrature signals RS and IS. The coupled signal is sent as the equalized signal OUT to a demodulator 58.

The demodulator 58 comprises a coherent detector 59 responsive to the equalized signal OUT and to a recovered carrier wave supplied from a carrier recovery circuit 60. The coherent detector 59 carries out coherent detection with reference to the recovered carrier wave to produce a demodulated baseband signal. The demodulated baseband signal consists of in-phase and quadrature baseband signals represented by BP and BQ, respectively. The in-phase and the quadrature baseband signals BP and BQ have an in-phase and a quadrature level, respectively. Responsive to the in-phase and the quadrature baseband signals BP and BQ, a clock generator 61 delivers a reproduced clock signal CLK to both of the gain control circuit 54 and a discriminator 62. The reproduced clock signal CLK is a reproduction of the reference clock signal. The discriminator 62 produces a reproduced data signal DATA as a demodulator output signal. The reproduced data signal DATA is a reproduction of the transmission data signal. The discriminator 62 further produces an in-phase data component DP and a quadrature data component DQ each of which is a part of the reproduced data signal DATA. The discriminator 62 also produces a digital error signal. The digital error signal is related to the reproduced data signal DATA. The digital error signal consists of in-phase and quadrature error signals EP and EQ which correspond to the in-phase and the quadrature data components DP and DQ, respectively. The in-phase and the quadrature error signals EP and EQ may be referred to as an in-phase and a quadrature phase deviation signals described hereinabove. Such a discriminator 62 may be a decision circuit described in the Ryu patent and will therefore not be described any longer.

The carrier recovery circuit 60 additionally produces the recovered carrier wave in response to the in-phase and the quadrature data components DP and DQ and the in-phase and the quadrature error signals EP and EQ. The carrier recovery circuit 60 is coupled to an asynchronous detection circuit 63. The asynchronous detection circuit 63 monitors the carrier recovery circuit 60 to detect an asynchronous state of the equalizer and to produce an asynchronous state signal ASY representative of the asynchronous state when the asynchronous detection circuit 63 detects the asynchronous state.

Responsive to the in-phase and the quadrature baseband signals BP and BQ and the reproduced clock signal CLK, the validity decision circuit 40 produces a decision signal DS in a manner which will later be described. The decision signal DS represents validity of the in-phase and the quadrature error signals EP and EQ in the form of logic values one and zero. Namely, both of the in-phase and the quadrature error signals EP and EQ are valid when the decision signal DS has the logic one value. On the other hand, both of the in-phase and the quadrature error signals EP and EQ are invalid when the decision signal has the logic zero value. The reproduced clock signal CLK is allowed to pass through the AND gate 41 as a specific clock signal CLK'. The first flip flop 42a is for delaying the in-phase error signal EP to produce a delayed in-phase error signal EP'. Likewise, the second flip flop 42b is for delaying the quadrature error signal EQ to produce a delayed quadrature error signal EQ'. The third and the fourth flip flops 42c and 42d are for delaying the in-phase and the quadrature data components DP and DQ to produce delayed in-phase and quadrature data components DP' and DQ'.

Responsive to the reproduced clock signal CLK, to the delayed in-phase and quadrature error signals EP' and EQ', and to the delayed in-phase and quadrature data components DP' and DQ', the gain control circuit 54 controls the controllable tap gains C(j) in the manner described in Ryu patent. Thus, the first and the second flip flops 42a and 42b suspend those operations during the decision signal has logic zero value. In other words, both of the in-phase and the quadrature error signals EP and EQ are suspended by the first and the second flip flops 42a and 42b when the in-phase and the quadrature error signals EP and EQ are invalid.

Figure 9:
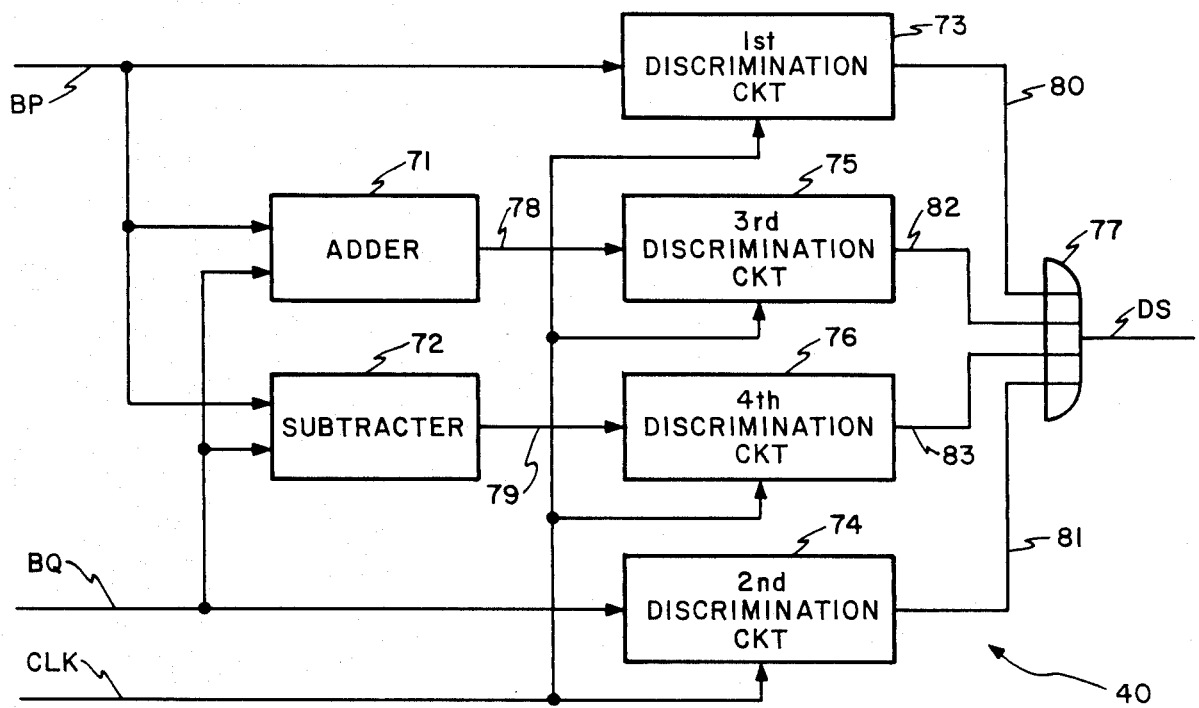
FIG. 9 is a block diagram of a validity decision circuit according to a first embodiment of this invention.
Figure 10:
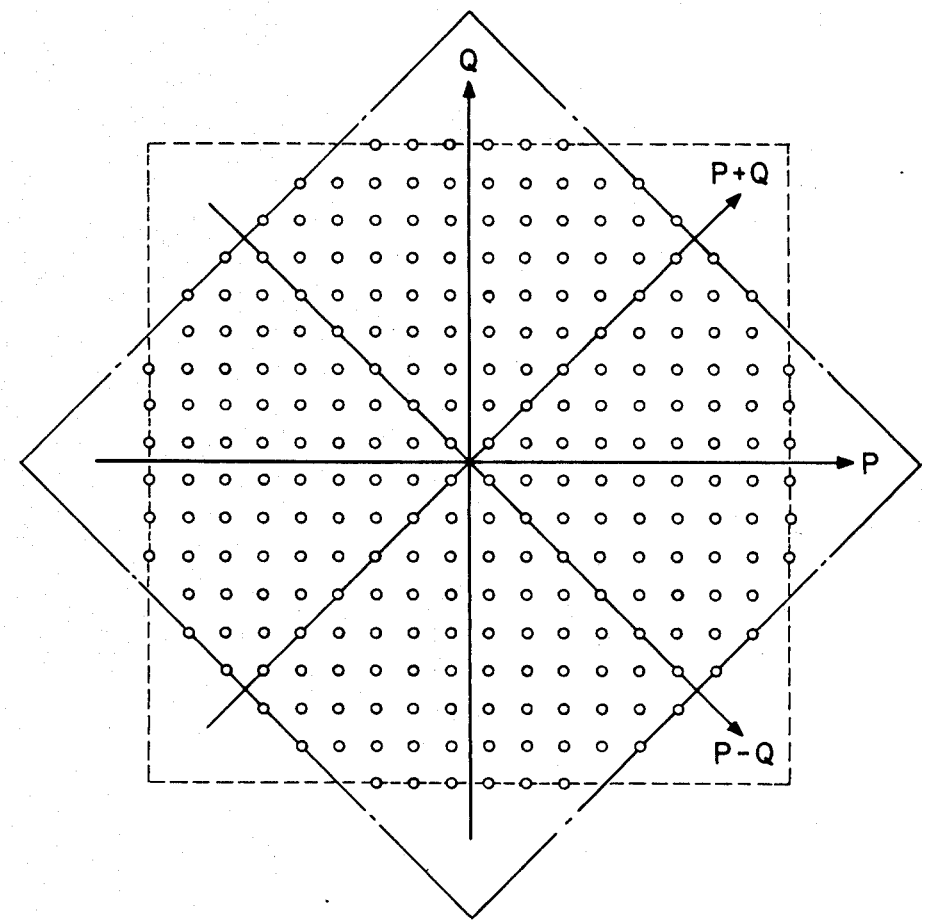
FIG. 10 is a view for use in describing validity decision of the validity decision circuit illustrated in FIG. 9.

Referring to FIGS. 9 and 10, the description will proceed to the validity decision circuit 40. The validity decision circuit 40, is supplied with the reproduced clock signal CLK, and the in-phase and the quadrature baseband signals BP and BQ as described in conjunction with FIG. 8. In FIG. 10, reception signal points are arranged on the phase plane in the form of an approximately octangular arrangement of the type described before in conjunction with FIG. 4. The in-phase baseband signal BP has an in-phase signal level which can represent one of eighteen levels depicted in FIG. 10 by the reception signal points vertically arranged orthogonal to the real axis P of the phase plane. Likewise, the quadrature baseband signal BQ has a quadrature signal level which can represent one of eighteen levels depicted in FIG. 10 by the reception signal points horizontally arranged orthogonal to the imaginary axis Q.

The validity decision circuit 40 comprises an adder 71, a subtracter 72, first through fourth discrimination circuits 73, 74, 75, and 76, and an OR gate 77. Supplied with the in-phase and the quadrature baseband signals BP and BQ, the adder 71 calculates a sum of the in-phase and the quadrature baseband signals BP and BQ in synchronism with the reproduced clock signal CLK and produces a sum signal 78. The sum signal 78 has a sum level which can represent one of twenty-five levels orthogonal to an axis (P+Q) which passes through the origin and forms an angle of forty-five degrees with both of the real and the imaginary axes P and Q as shown in FIG. 10. The axis (P+Q) may be called a sum axis. The sum signal 78 is delivered to the second discrimination circuit 74. Supplied with the in-phase and the quadrature baseband signals BP and BQ, the subtracter 72 calculates a difference between the in-phase baseband signal BP and the quadraqure baseband signal BQ in synchronism with the reproduced clock signal CLK and produces a difference signal 79. The difference signal 79 has a difference level which can represent one of twenty-five levels orthogonal to another axis (P−Q) which passes through the origin and orthogonally crosses the axis (P+Q) as shown in FIG. 10. The axis (P−Q) may be called a difference axis. The difference signal 79 is delivered to the third discrimination circuit 75.

The first discrimination circuit 73 is supplied with the in-phase baseband signal BP and the reproduced clock signal CLK. In synchronism with the reproduced clock signal CLK, the first discrimination circuit 73 discriminates whether the in-phase signal level is higher than a first positive predetermined level or is lower than a first negative predetermined level.

Figure 11:
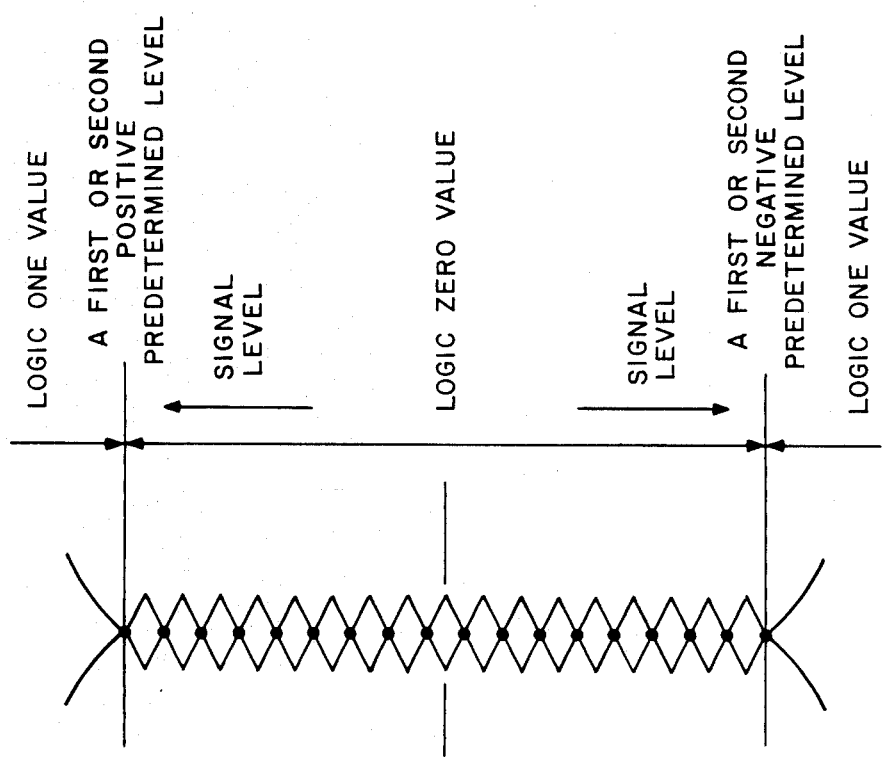
FIG. 11 is a view for use in describing discrimination operation of a signal level of the validity decision circuit illustrated in FIG. 9.

Referring to FIG. 11, a first eye pattern has eighteen cross points indicated by dots. The eighteen cross points are divided into first through ninth cross points of an upper half and first through ninth cross points of a lower half. The ninth cross point of the upper half is a top point while the ninth point of the lower half is a bottom point. The first through the ninth cross points of the upper half correspond to first through ninth positive threshold levels, respectively. The first through the ninth cross points of the lower half correspond to first through ninth negative threshold levels, respectively.

The ninth positive and the ninth negative threshold levels are equal to each other in absolute value. The ninth positive threshold level will be called the first positive predetermined level while the ninth negative threshold level will be called the first negative predetermined level. The in-phase baseband signal BP has the first positive predetermined level when the in-phase signal level is positioned most outwardly of a positive sense of the real axis P. The in-phase baseband signal BP has the first negative predetermined level when the in-phase signal level is positioned most outwardly of a negative sense of the real axis P.

Turning back to FIG. 9, the first discrimination circuit 73 produces a first binary discrimination signal 80 with a logic one value when the in-phase signal level is either higher than the first posiitve predetermined level or is lower than the first negative predetermined level. Otherwise, the first binary discrimination signal 80 has a logic zero value.

The second discrimination circuit 74 is supplied with the quadrature baseband signal BQ and the reproduced clock signal CLK. In synchronism with the reproduced clock signal CLK, the second discrimination circuit 74 discriminates the quadrature signal level with reference to the first eye pattern described above. The second discrimination circuit 74 therefore has second positive and second negative predetermined levels for discrimination of the quadrature signal level. The quadrature baseband signal BQ has the second positive predetermined level when the quadrature signal level is positioned most outwardly of the positive sense of the imaginary axis Q. The quadrature baseband signal BQ has the second negative predetermined level when the quadrature signal level is positioned most outwardly of the negative sense of the imaginary axis Q.

The second discrimination circuit 74 produces a second discrimination signal 81 with the logic one value when the quadrature signal level is either higher than the second positive predetermined level or is lower than the second negative predetermined level. Otherwise, the second discrimination signal 81 has the logic zero value. It is to be noted here that the first positive and the second positive predetermined levels are equal to each other while the first negative and the second negative predetermined levels are equal to each other. Thus, discrimination is carried out whether or not at least one of the reception signal points is outwardly of a first region defined by an upright square depicted by dashed lines in FIG. 10.

The third discrimination circuit 75 is supplied with the sum signal 78 and the reproduced clock signal CLK. In synchronism with the reproduced clock signal CLK, the third discrimination circuit 75 discriminates whether the sum level is higher than a third positive predetermined level or is lower than a third negative predetermined level.

Figure 12:
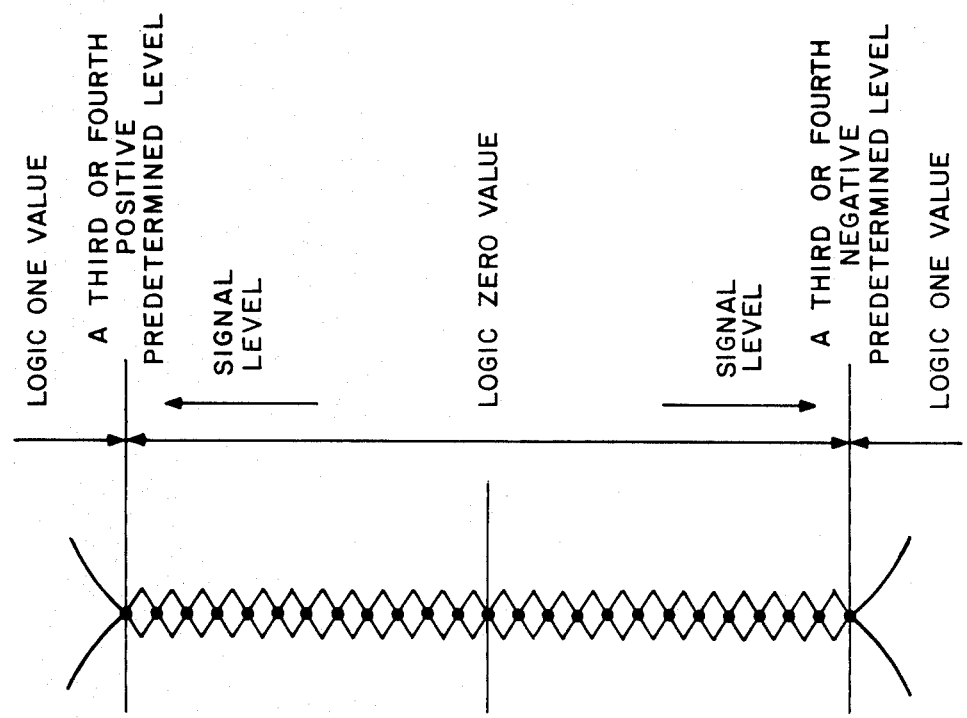
FIG. 12 is a view for use in describing other discrimination operation of a signal level of the validity decision circuit illustrated in FIG. 9.

Referring to FIG. 12, a second eye pattern has twenty-five cross points indicated by dots. The twenty-five cross points are divided into first through thirteenth cross points of an upper half and first through thirteenth cross points of a lower half. The first cross point of the upper half is coincident with the first cross point of the lower half and corresponds to the origin of the phase plane depicted in FIG. 10. The thirteenth cross point of the upper half is a top point while the thirteenth cross point of the lower half is a bottom point. The first through the thirteenth cross points of the upper half correspond to first through thirteenth positive threshold levels, respectively. The first through the thirteenth cross points of the lower half correspond to first through thirteenth negative threshold levels, respectively.

The thirteenth positive and the thirteenth negative threshold levels are equal to each other in absolute value. The thirteenth positive threshold level will be called the third positive predetermined level while the thirteenth negative threshold level will be called the third negative predetermined level. The sum signal 78 has the third positive predetermined level when the sum level is positioned most outwardly of the positive sense of the axis (P+Q). The sum signal 78 has the third negative predetermined level when the sum level is positioned most outwardly of the negative sense of the axis (P+Q).

Turning back to FIG. 9, the third discrimination circuit 75 produces a third binary discrimination signal 82 with the logic one value when the sum level is either higher than the third positive predetermined level or is lower than the third negative predetermined level. Otherwise, the third binary discrimination signal 82 has the logic zero value.

The fourth discrimination circuit 76 is supplied with the difference signal 79 and the reproduced clock signal CLK. In synchronism with the reproduced clock signal CLK, the fourth discrimination cricuit 76 discriminates the difference level with reference to the second eye pattern described above. The fourth discrimination circuit 76 therefore has fourth positive and fourth negative predetermined levels for discrimination of the difference level. The difference signal 79 has the fourth positive predetermined level when the difference level is positioned most outwardly of the positive sense of the axis (P−Q). The difference signal 79 has the fourth negative predetermined level when the difference level is positioned most outwardly of the negative sense of the axis (P−Q).

The fourth discrimination circuit 76 produces a fourth binary discrimination signal 83 with the logic one value when the difference level is either higher than the fourth positive predetermined level or is lower than the fourth negative predetermined level. Otherwise, the fourth binary discrimination signal 83 has the logic zero value. It is to be noted here that the third positive and the fourth negative predetermined levels are equal to each other while the third negative and the fourth negative predetermined levels are equal to each other. Thus, discrimination is carried out whether or not at least one of the reception signal points is outwardly of a second square region defined by an oblique square depicted by dot-and-dash lines in FIG. 10.

In connection with the discrimination described above, it is to be noted here that the discrimination is carried out whether or not at least one reception signal points is outwardly of a specific region defined by an octangle which is common to the first and the second square regions shown in FIG. 10.

In FIG. 9, the first through the fourth binary discrimination signals 80 to 83 are delivered to the OR gate 77. The OR gate 77 produces a decision signal DS with the logic one value when at least one of the first through the fourth discrimination signals 80 to 83 has the logic one value. Otherwise, the decision signal DS has the logic zero value. As described above, the validity decision circuit 40 can produce the decision signal DS without conversion of the octangular arrangement to the square signal point arrangement.

Figure 13:
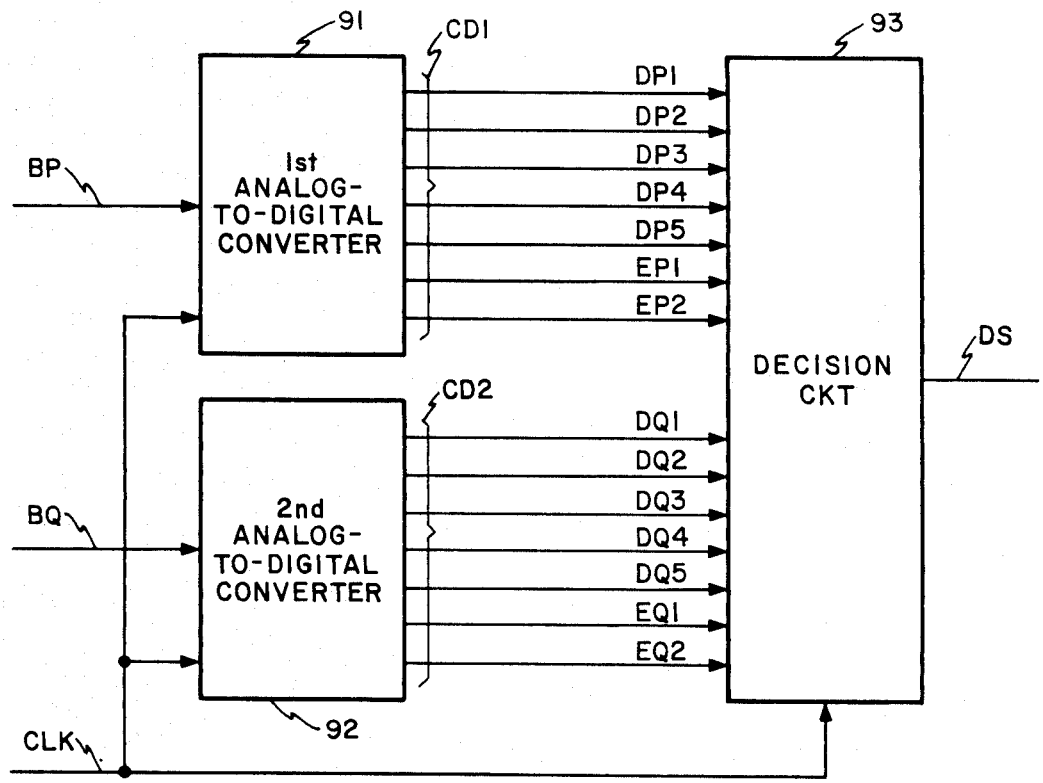
FIG. 13 is a block diagram of a validity decision circuit according to a second embodiment of this invention.
Figure 14:
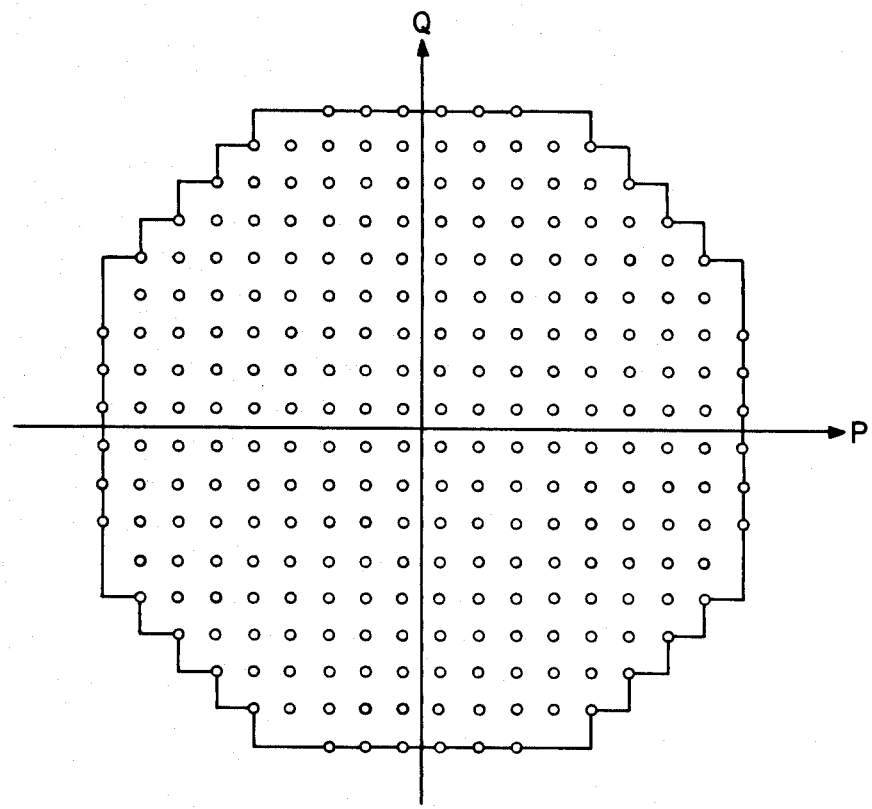
FIG. 14 is a view for use in describing validity decision of the validity decision circuit illustrated in FIG. 13.

Referring to FIGS. 13 and 14, the description will proceed to a validity decision circuit according to a second embodiment of this invention. In the validity decision circuit, the validity decision is carried out by digital process.

The validity decision circuit is supplied with the reproduced clock signal CLK and the in-phase and the quadrature baseband signals BP and BQ and comprises first and second analog-to-digital converters 91 and 92 and a decision circuit 93.

In synchronism with the reproduced clock signal CLK, the first analog-to-digital converter 91 converts the in-phase baseband signal BP into a first converted digital signal CD1 which consists of first through seventh bits DP1, DP2, DP3, DP4, DP5, EP1, and EP2. In synchronism with the reproduced clock signal CLK, the second analog-to-digital converter 92 converts the quadrature baseband signal BQ to a second converted digital signal CD2 consisting of first through seventh bits DQ1, DQ2, DQ3, DQ4, DQ5, EQ1, and EQ2. The first bit DP1 or DQ1 is the most significant bit. The seventh bit EP2 or EQ2 is the least significant bit.

Like FIG. 10, FIG. 14 schematically shows the reception signal points on the phase plane. The reception signal points are arranged on an approximately octangular specific region. The in-phase baseband signal BP has an in-phase signal level which can represent one of eighteen levels depicted in FIG. 14 by the reception signal points vertically arranged orthogonal to the real axis P of the phase plane. The quadrature baseband signal BQ has a quadrature signal level which can represent one of eighteen levels depicted by the reception signal points horizontally arranged orthogonal to the imaginary axis Q.

Figure 15:
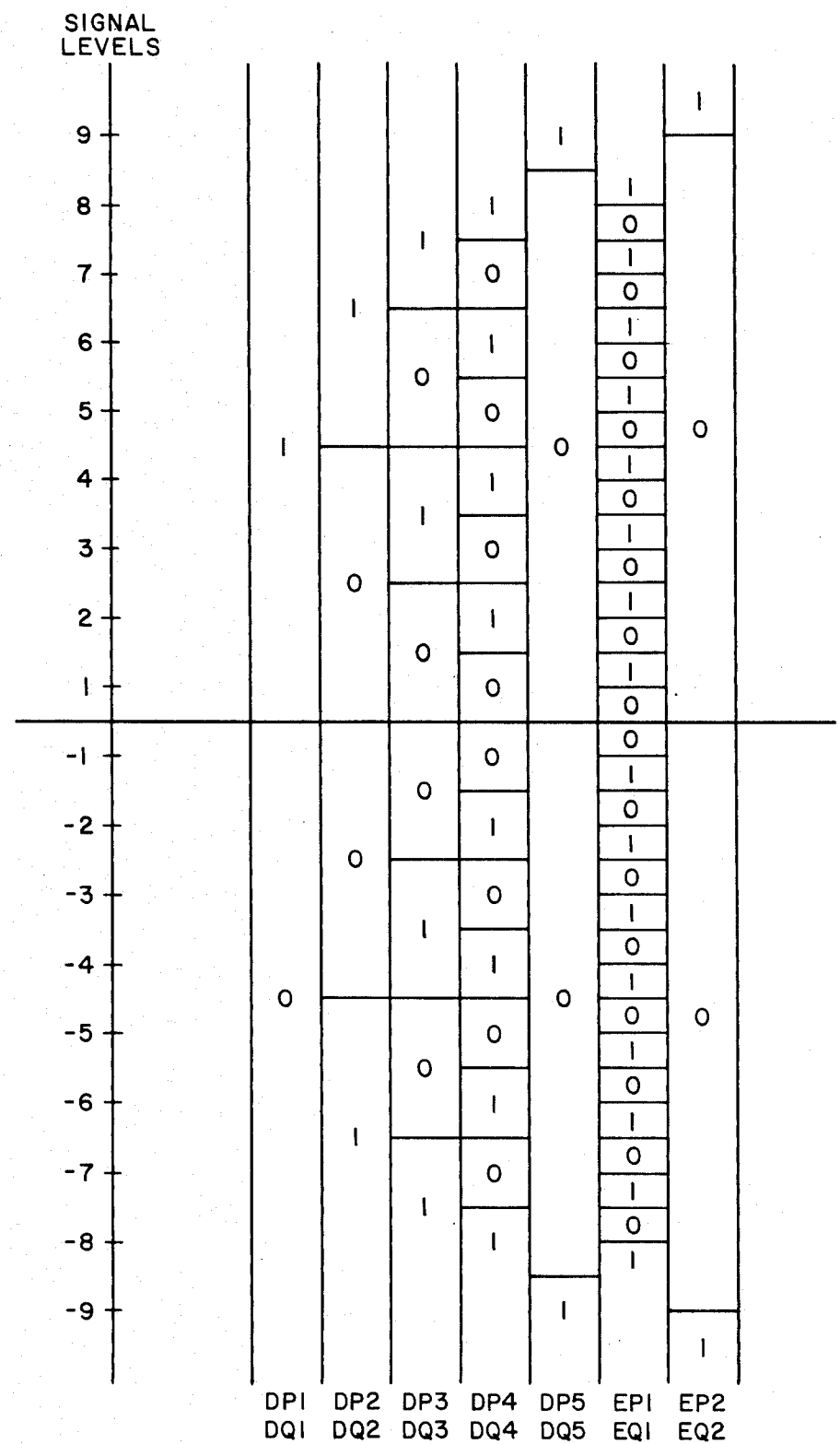
FIG. 15 is a view for use in describing operation of first and second analog-to-digital converters in the validity decision circuit illustrated in FIG. 13.

Referring to FIG. 15, the eighteen signal levels of each of thein-phase and the quadrature baseband signals BP and BQ are indicated at plus 9 through minus 9 excluding zero. On producing the first and the second converted digital signals CD1 and CD2 (FIG. 13), the analog-to-digital converters 91 and 92 use a common conversion rule. The first through the fifth bits DP1 to DP5 or DQ1 to DQ5 collectively represent the eighteen levels. The sixth bit EP1 or EQ1 represents a phase deviation which is had, relative to a corresponding one of the output signal points of FIG. 4, by each of the reception signal points representative of the signal levels between plus 8 and minus 8, both inclusive. The seventh bit EP2 or EQ2 reprsent a phase decision which is had, relative to a corresponding one of the output signal points, by each of the reception signal points of the plus 9 and the minus 9 signal levels.

In FIG. 13, the decision circuit 93 may be implemented by a combination of electronic circuits. It is, however, desirable to use a memory device, such an ROM (read only memory), as the decision circuit 93. In this event, the ROM receives the first and the second converted digital signals CD1 and CD2 as its address information. Namely, the address information collectively represent the respective positions of the reception signal points. In synchronism with the reproduced clock signal CLK, the decision circuit 93 produces the decision signal DS with the logic one value when the address information has one of first through sixteenth bit patterns which will presently be described. Otherwise, the decision signal DS is produced with the logic zero level.

Referring to FIG. 16, the first through the sixteenth bit patterns are indicated at bit pattern numbers 1 to 16. Such bit pattern consists of the logic one and/or zero value of the first through the seventh bits DP1 to DP5, EP1, and EP2 or DQ1 to DQ5, EQ1, and EQ2 illustrated in FIG. 15. In FIG. 16, a cross indicates whichever of the logic one and zero values. For example, the address information has the first bit pattern when the seventh bit EQ2 of the second converted digital signal CD2 has the logic one value.

Referring to FIGS. 17(a) through 17(f) together with FIGS. 13, 15, and 16, the description will proceed to decision operation carried out by the decision circuit 93. In each of FIGS. 17(a) to (f), the reception signal points are depicted only in the first quadrant of the phase plane. This is because the decision operation is carried out similarly in the first through the fourth quadrants.

In the manner described before, the in-phase and the quadrature baseband signals BP and BQ cooperatively represent one of the reception signal points at a time. With reference to the address information given by the first and the second converted digital signals CD1 and CD2, the decision circuit 93 decides whether or not the above-mentioned one of the reception signal points is in the approximately octangular specific region.

Figure 17A:
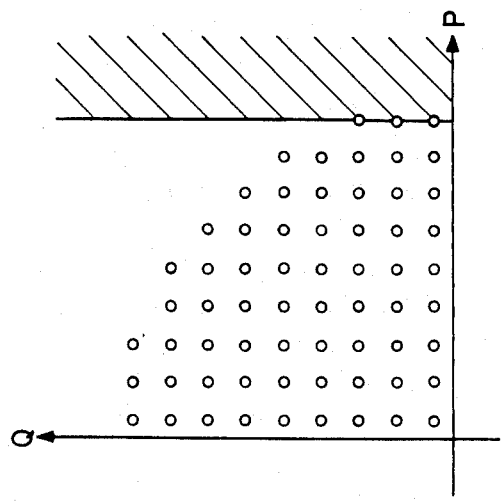
FIGS. 17(a) through 17(f) are views for use in describing decision operation of the decision circuit in the validity decision circuit illustrated in FIG. 13.
Figure 17B:
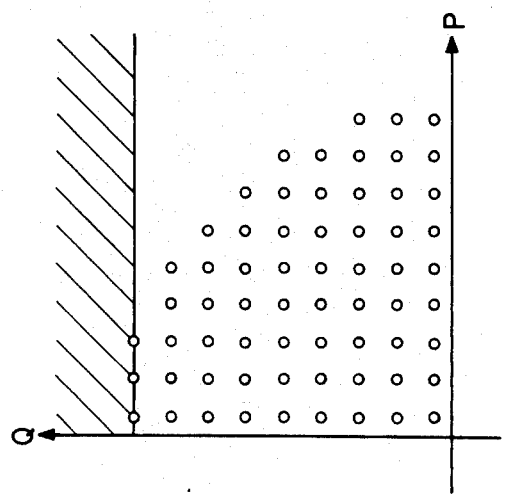
Figure 17C:
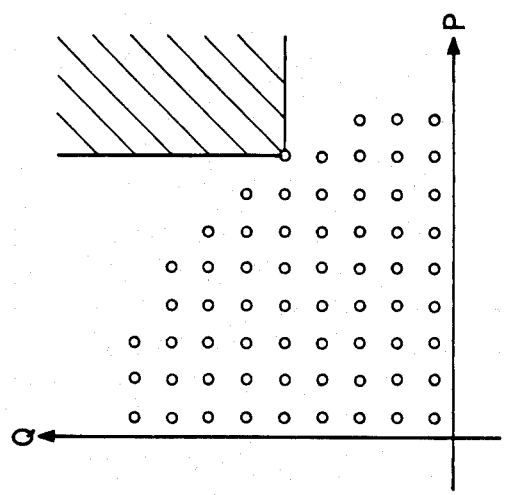
Figure 17D:
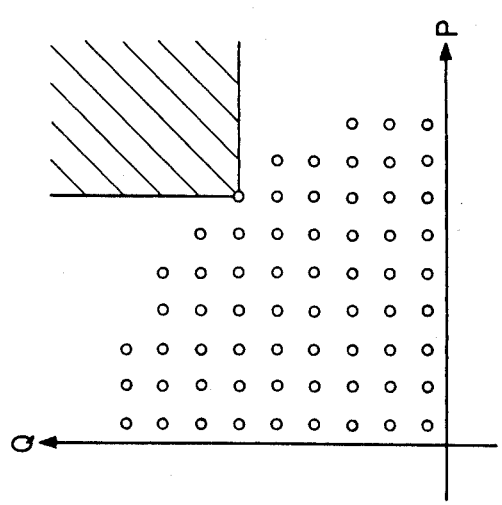
Figure 17E:
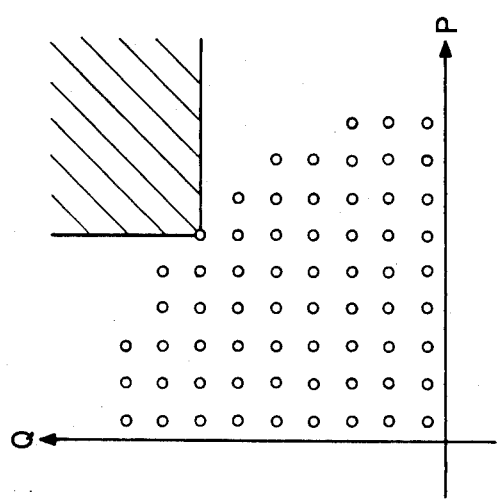
Figure 17F:
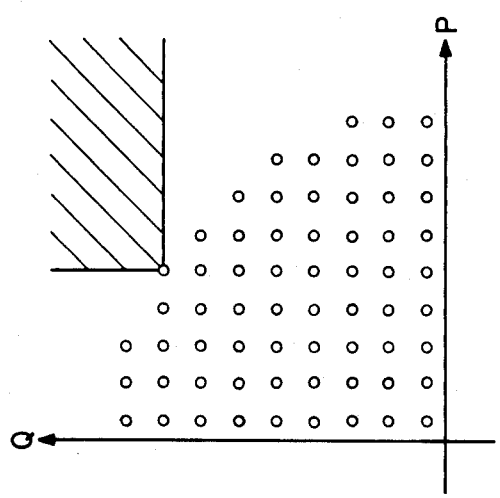

For this purpose, a first region is indicated in FIG. 17(a) by a hatched area in which the in-phase baseband signal BP has the level of plus 9 or higher. A second region is hatched in FIG. 17(b), in which the quadrature baseband signal BQ has the level of 9 or above. A third region is hatched in FIG. 17(c), in which the in-phase and the quadrature baseband signals have the level of plus 8 or above and the level 5 or higher, respectively. A fourth region is illustrated with hatches in FIG. 17(d), wherein the in-phase and the quadrature baseband signals BP and BQ have the levels of plus 7 and 6 or higher. A fifth region is hatched in FIG. 17(e), wherein the in-phase and the quadrature baseband signals BP and BQ have the levels of plus 6 and plus 7 or higher. In a sixth region depicted in FIG. 17(f) with hatches, the in-phase and the quadrature baseband signals BP and BQ have the levels of plus 5 and plus 8 or above.

When the seventh bit EP2 has the logic one value, the in-phase baseband signal BP has a reception signal point in the first region in the manner understood from FIG. 15. When the seventh bit EQ2 has the logic one value, the quadrature baseband signal BQ has a reception signal point in the secnd region. In FIG. 16, the address information has the first and the second bit patterns when each of the seventh bits EP2 and EQ2 of the first and the second converted digital signals CD1 and CD2 has the logic one value.

When the address information has one of the third through the fifth bit patterns, the in-phase and the quadrature baseband signals BP and BQ cooperatively represent a reception signal point in the third region. When the address information has one of the sixth through the ninth bit patterns, the in-phase and the quadrature baseband signals BP and BQ represent a reception signal point in the fourth region. The in-phase and the quadrature baseband signals BP and BQ cooperate to represent reception signal points in the fifth and the sixth regions when the address information has one of the tenth through the thirteenth bit patterns and one of the fourteenth through the sixteenth bit patterns, respectively.

The decision circuit 93 produces a decision signal DS. When the reception signal point is in one of the first through the sixth regions, the decision signal DS is given the logic one value. The decision signal DS of the logic one value indicates that at least one of the sixth and the seventh bits EP1, EP2, EQ1, and EQ2 is valid that has the logic one value. In other words, the decision signal DS of the logic one value indicates that at least one of the first and the second phase deviation signals EP and EQ (FIG. 8), namely, error signals, is valid that has the logic one value.

Figure 18:
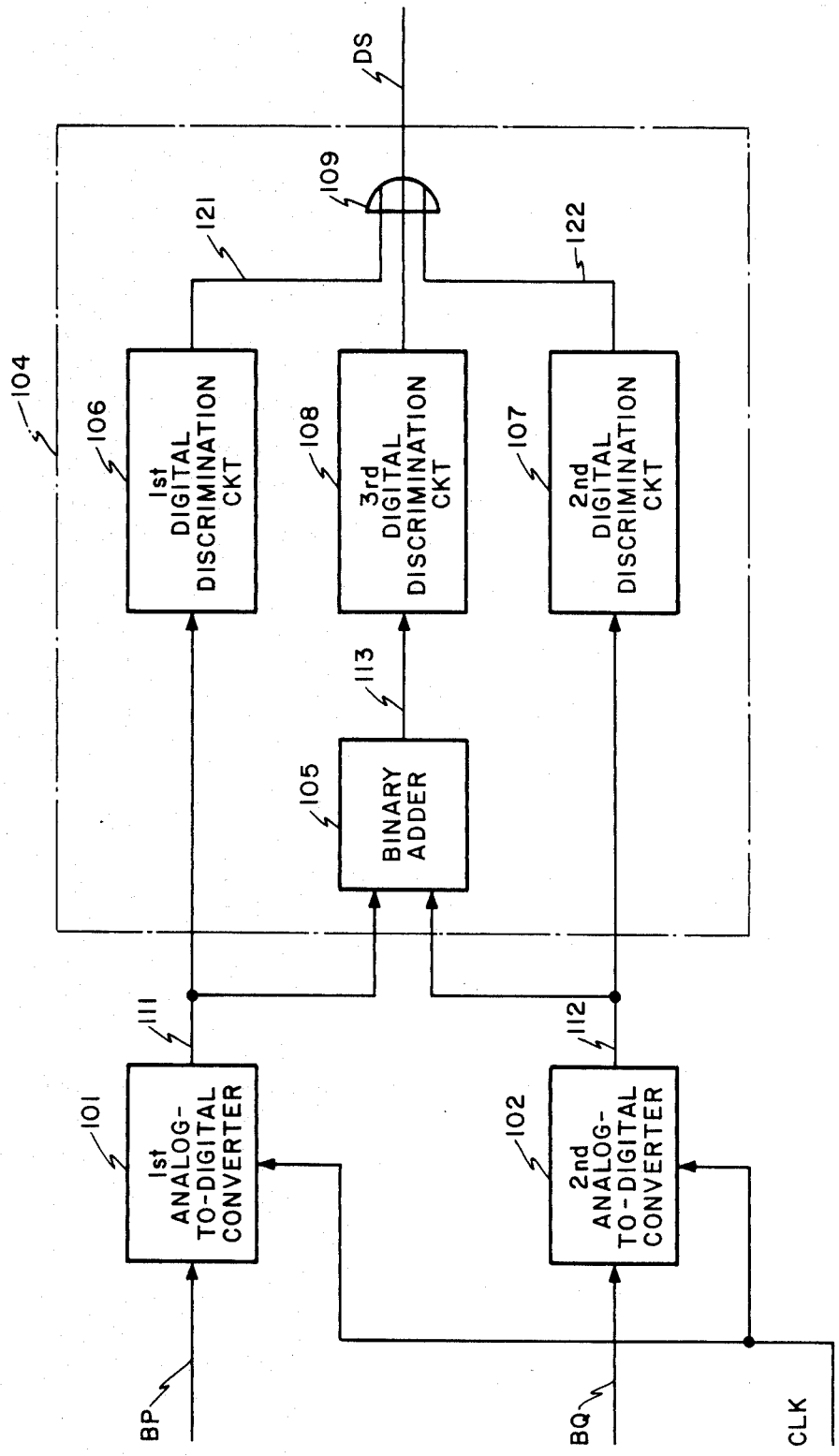
FIG. 18 is a block diagram of a validity decision circuit according to a third embodiment of this invention.

Referring to FIG. 18, the description will proceed to a validity decision circuit according to a third embodiment of this invention. The validity decision circuit is for use as the decision circuit 40 in FIG. 8 and is supplied with the reproduced clock signal CLK and the in-phase and the quadrature baseband signals BP and BQ. In the manner so far described, the in-phase baseband signal BP has an in-phase signal level which can represent one of eighteenth levels. The quadrature baseband signal BQ has a quadrature signal level which can represent one of eighteen levels.

The validity decision circuit comprises first and second analog-to-digital converters 101 and 102, and a decision circuit 104. The decision circuit 104 comprises a binary adder 105, first through third digital discrimination circuits 106, 107, and 108, and an OR gate 109. Supplied with the in-phase baseband signal BP and the reproduced clock signal CLK, the first analog-to-digital converter 101 converts the in-phase baseband signal BP to a first converted digital signal in synchronism with the reproduced clock signal CLK. The first converted digital signal includes an in-phase digital signal 111 which will presently be described Likewise, the second analog-to-digital converter 102 converts the quadrature baseband signal BQ to a second converted digital signal in synchronism with the reproduced clock signal CLK. The second converted digital signal includes a quadrature digital signal 112.

Figure 19:
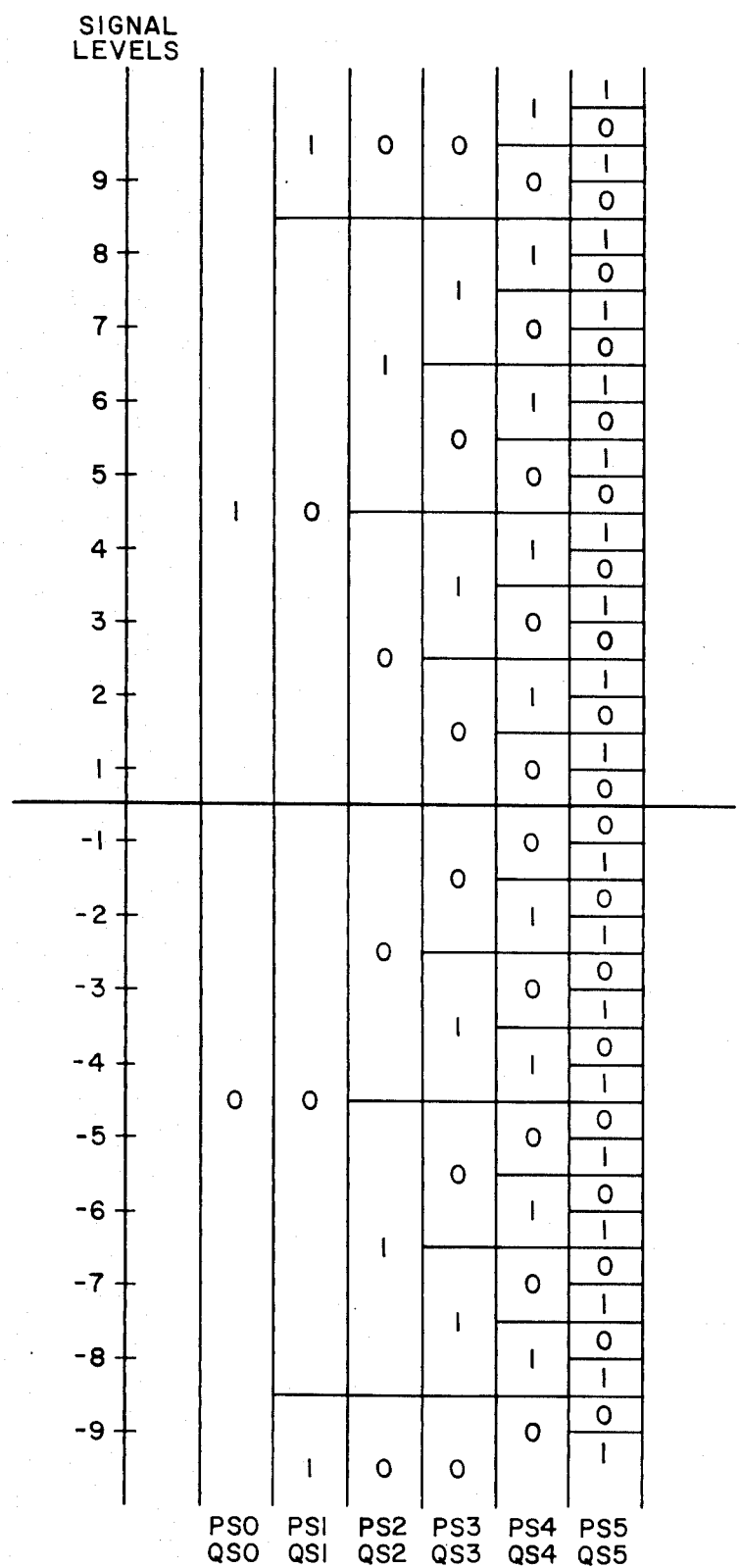
FIG. 19 is a view for use in describing operation of first and second analog-to-digital converters in the validity decision circuit illustrated in FIG. 18.

Referring to FIG. 19, the eighteen signal levels of each of the in-phase and the quadrature baseband signals BP and BQ are indicated at plus 9 through minus 9 excluding zero. The first converted digital signal consists of zeroth through fifth bits PS0, PS1, PS2, PS3, PS4, and PS5 while the second converted digital signal consists of zeroth through fifth bits QS0, QS1, QS2, QS3, QS4, and QS5. The zeroth bit PS0 is a most significant bit and represents whether the in-phase signal level has a positive or a negative sign. Likewise, the zeroth bit QS0 represents whether the quadrature signal level has a positive or a negative sign. The in-phase signal level has an "in-phase" absolute value |P| represented by cooperation of the first through the fifth bits PS1 to PS5. The quadrature signal level has a "quadrature" absolute value |Q| represented by cooperation of the first through the fifth bits QS1 to QS5.

In FIG. 18, the in-phase digital signal 111 is supplied to the binary adder 105 and the first digital discrimination circuit 106. The quadrature digital signal 112 is supplied to the binary adder 105 and the second digital discrimination circuit 107. Supplied with the in-phase and the quadrature digital signals 111 and 112, the binary adder 105 calculates a sum of the in-phase absolute value |P| and the quadrature absolute value |Q| and produces a sum signal 113 having a "sum" absolute value (|P|+|Q|). The sum signal 113 is supplied to the third digital discrimination circuit 108.

Figure 20:
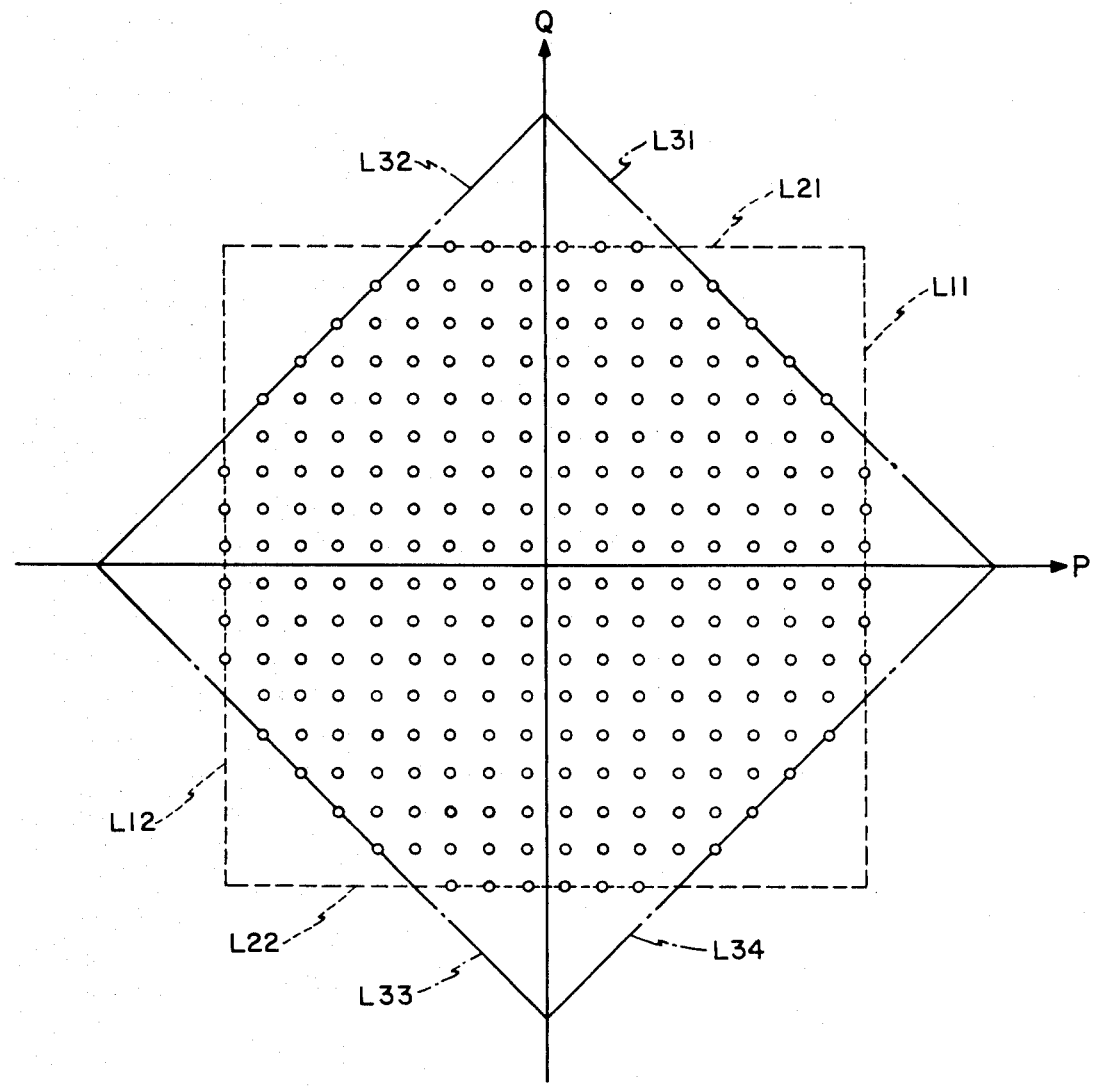
FIG. 20 is a view for use in describing validity decision of the validity decision circuit illustrated in FIG. 18.

Referring to FIG. 20, reception signal points are arranged on an approximately octangular specific region like FIG. 10. Sixteen outermost reception signal points are on first and second vertical dashed lines L11 and L12 orthogonal to the real axis P and first and second horizontal dashed lines L21 and L22 orthogonal to the imaginary axis Q. Other sixteen outermost reception signal points are on first through fourth lines L31, L32, L33, and L34 defined by an oblique square depicted with dot and dash lines. As described in conjunction with FIG. 10, the decision circuit 104 decides whether or not at least one reception signal points is outwardly of the first and the second vertical dashed lines L11 and L12, the first and the second horizontal dashed lines L21 and L22, and the first through the fourth lines L31 to L34. As described in conjunction with FIGS. 17(a) through 17(f), the outermost reception signal points lying on the first and the second vertical lines L11 and L12 are defined by an absolute value "9". Likewise, the outermost reception signal points lying on the first and the second horizontal lines L21 and L22 are defined by the absolute value "9". The outermost reception signal points lying on the first through the fourth lines L31 to L34 are defined by an absolute value "13".

The first digital discrimination circuit 106 is for discriminating whether or not at least one of the reception signal points is outwardly of the first or the second vertical dashed line L11 or L12. The second digital discrimination circuit 107 is for discriminating whether or not at least one of the reception signal points is outwardly of the first or the second horizontal dashed line L21 or L22. The third digital discrimination circuit 108 is for discriminating whether or not at least one of the reception signal points is outwardly of one of the first through the fourth lines L31 to L34. Each of the first through the third digital discrimination circuit 106 to 108 carries out level discrimination as regards the in-phase, the quadrature, and the sum absolute values |P|, |Q|, and (|P|+|Q|). The zeroth bits PS0 and QS0 are unnecessary for the level discrimination.

Supplied with the in-phase digital signal 111, the first digital discrimination circuit 106 produces a first binary discrimination signal 121 with a logic one value when the absolute value |P| is larger than the absolute value "9". Otherwise, the first discrimination signal 121 has a logic zero value. Supplied with the quadrature digital signal 112, the second digital discrimination circuit 107 produces a second binary discrimination signal 122 witht he logic one value when the absolute value |Q| is larger than the absolute value "9". Otherwise, the second binary discrimination signal 122 has the logic zero value. Supplied with the sum signal 113, the third digital discrimination circuit 108 produces a third binary discrimination signal 123 with the logic one value when the absolute value (|P|+|Q|) is larger than the absolute value "13". Otherwise, the third binary discrimination signal 123 has the logic zero value. As described in conjunction with FIG. 13, each of the first through the third digital discrimination circuits 106 to 108 may be implemented by an ROM.

The first through the third binary discrimination signals 121 to 123 are delivered to the OR gate 109. The OR gate 109 produces a decision signal DS with the logic one value when at least one of the first through the third binary discrimination signals 121 to 123 has the logic one value. Otherwise, the decision signal DS has thelogic zero level. The decision signal DS of the logic one value indicates that at least one of the first and the second phase deviation signals EP and EQ (FIG. 8), namely, error signals, is valid that has the logic one value.

While this invention has thus far been described in conjunction with several preferred embodiments thereof, it will readily be possible for those skilled in the art to put this invention into practice in various other manners. For example, the number of the reception signal points may be sixty-four. The decision signal is useful in controlling a cross-polarized wave interference compensator.

What is claimed is:

1. A validity decision circuit for use in a demodulator used as a counterpart of a modulator for modulating a modulator input signal into a multilevel quadrature amplitude modulated signal specified by a plurality of signal points on a phase plane having an origin and real and imaginary axes crossing at said origin, said modulator rearranging a square arrangement of said signal points into an approximately octangular arrangement in which said signal points are arranged on an approximately octangular region having a specific region inwardly of an octangle, said demodulator being for demodulating said multilevel quadrature amplitude modulated signal into an in-phase baseband signal and a quadrature baseband signal and for converting said in-phase and said quadrature baseband signals into a demodulator output signal and an error signal, said in-phase baseband signal having an in-phase signal level, said quadrature baseband signal having a quadrature signal level, each of said in-phase and said quadrature signal levels being related to one of said signal points at a time, wherein the improvement comprises:

adder means for adding said in-phase baseband signal and said quadrature baseband signal to produce a sum signal having a sum level representing a sum of said in-phase signal level and said quadrature signal level, said sum level being orthogonal to a sum axis which passes through said origin and forms an angle of forty-five degrees with both of said real and said imaginary axes;

subtracter means for subtracting said in-phase signal level and said quadrature signal level to produce a difference signal having a difference level representing a difference of said in-phase signal level and said quadrature signal level, said difference level being orthogonal to a difference axis which passes through said origin and orthogonally crosses said sum axis;

first discriminating means responsive to said in-phase baseband signal for discriminating said in-phase signal level to produce a first binary discrimination signal;

second discriminating means responsive to said quadrature baseband signal for discriminating said quadrature signal level to produce a second binary discrimination signal;

third discriminating means coupled to said adder means and responsive to said sum signal for discriminating said sum level to produce a third binary discrimination signal;

fourth discriminating means coupled to said subtracter means for discriminating said difference level to produce a fourth binary discrimination signal; and OR gate means responsive to said first through said fourth binary discrimination signals for producing at least one of said first through said fourth discrimination signals as a decision signal representing the fact that said error signal is valid.

2. A validity decision circuit for use in a demodulator used as a counterpart of a modulator for modulating a modulator input signal into a multilevel quadrature amplitude modulated signal specified by a plurality of signal points on a phase plane, said modulator rearranging a square arrangement of said signal points into an approximately octangular arrangement in which said signal points are arranged on an approximately octangular region having a specific region inwardly of an octangle, said demodulator being for demodulating said multilevel quadrature amplitude modulated signal into an in-phase baseband signal and a quadrature baseband signal and for converting said in-phase and said quadrature baseband signals into a demodulator output signal and an error signal, said in-phase baseband signal having an in-phase signal level, said quadrature baseband signal having a quadrature signal level, each of said in-phase and said quadrature signal levels being related to one of said signal points at a time, wherein the improvement comprises:

a first analog-to-digital converter for converting said in-phase baseband signal into a first converted digital signal;

a second analog-to-digital converter for converting said quadrature baseband signal into a second converted digital signal; and a decision circuit coupled to said first and said second analog-to-digital converters and responsive to said first and said second converted digital signals for deciding whether or not at least one of said signal points is outwardly of said specific region, said decision circuit thereby producing a decision signal representing the fact that said error signal is valid.

3. A validity decision circuit as claimed in claim 2, wherein said decision circuit comprises:

memory means for memorizing positions of said signal points related to said first and said second converted digital signals, said memory means receiving said first and said second converted digital signals as an address information and producing said decision signal on reception of predetermined address information, said predetermined address information being representing one of said positions of said signal points positioned at outside of said specific region.

4. A validity decision circuit for use in a demodulator used as a counterpart of a modulator for modulating a modulator input signal into a multilevel quadrature amplitude modulated signal specified by a plurality of signal points on a phase plane, said modulator rearranging a square arrangement of said signal points into an approximately octangular arrangement in which said signal points are arranged on an approximately octangular region having a specific region inwardly of an octangle, said demodulator being for demodulating said multilevel quadrature amplitude modulated signal into an in-phase baseband signal and a quadrature baseband signal and for converting said in-phase and said quadrature baseband signals into a demodulator output signal and an error signal, said in-phase baseband signal having an in-phase signal level, said quadrature baseband signal having a quadrature signal level, each of said in-phase and said quadrature signal levels being related to one of said signal points at a time, wherein the improvement comprises:

a first analog-to-digital converter for converting said in-phase baseband signal into a first digital signal representing said in-phase signal level in a first absolute value;

a second analog-to-digital converter for converting said quadrature baseband signal into a second digital signal representing said quadrature signal level in a second absolute value; and a decision circuit coupled to said first and said second analog-to-digital converters and responsive to said first and said second digital signals for deciding whether or not at least one of said signal points is outwardly of said specific region, said decision circuit thereby producing a decision signal representing the fact that said error signal is valid.

5. A validity decision circuit as claimed in claim 4, wherein said decision circuit comprises:

an adder for adding said first and said second digital signals to produce a sum signal representing a sum absolute value of said first absolute value and said second absolute value;

a first digital discriminating circuit coupled to said first analog-to-digital converter for discriminating said first absolute value to produce a first binary discrimination signal;

a second digital discriminating circuit coupled to said second analog-to-digital converter for discriminating said second absolute value to produce a second binary discrimination signal;

a third digital discriminating circuit coupled to said adder for discriminating said sum absolute value to produce a third binary discrimination signal; and OR gate means responsive to said first through said third binary discrimination signals for producing at least one of said first through said third discrimination signals as said decision signal.

* * * * *